(12) United States Patent
Tateno et al.

(10) Patent No.: US 6,577,373 B1
(45) Date of Patent: *Jun. 10, 2003

(54) LIQUID CRYSTAL DISPLAY AND METHOD OF MANUFACTURING THE SAME

(75) Inventors: Akihiko Tateno, Kyoto (JP); Hiroyuki Nakatani, Kyoto (JP); Kazuya Yoshimura, Osaka (JP); Makoto Nakahara, Osaka (JP); Daisuke Ikesugi, Osaka (JP); Takatoshi Kira, Osaka (JP)

(73) Assignees: Sekisui Chemical Co., Ltd., Osaka (JP); Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/445,592

(22) PCT Filed: Jun. 15, 1998

(86) PCT No.: PCT/JP98/02619

§ 371 (c)(1),
(2), (4) Date: Mar. 22, 2000

(87) PCT Pub. No.: WO98/57225

PCT Pub. Date: Dec. 17, 1998

(30) Foreign Application Priority Data

| Jun. 13, 1997 | (JP) | 9/156714 |
| Sep. 22, 1997 | (JP) | 9/257080 |
| Oct. 3, 1997 | (JP) | 9/271480 |
| Dec. 5, 1997 | (JP) | 9/335398 |
| Dec. 9, 1997 | (JP) | 9/338612 |
| Feb. 26, 1998 | (JP) | 10/045046 |

(51) Int. Cl.⁷ ................................. G02F 1/1339
(52) U.S. Cl. ........................................ 349/155
(58) Field of Search ............................ 349/156, 155

(56) References Cited

U.S. PATENT DOCUMENTS

| 6,259,498 B1 | * 7/2001 | Takeda .................. 349/84 |
| 6,275,280 B1 | * 8/2001 | Kajita et al. ............ 349/155 |
| 6,278,233 B1 | * 8/2001 | Sanou et al. ............ 313/459 |

FOREIGN PATENT DOCUMENTS

| JP | 62-148927 | 7/1987 |
| JP | 3-2831 | 1/1991 |
| JP | 3-293328 | 12/1991 |
| JP | 403293328 A | * 12/1991 |

(List continued on next page.)

*Primary Examiner*—Toan Ton
*Assistant Examiner*—Hoan Nguyen
(74) *Attorney, Agent, or Firm*—Connolly Bove Lodge & Hutz LLP

(57) ABSTRACT

This invention has its objects to provide a liquid crystal display exhibiting excellent display quality having good contrast which quality is not influenced by light leakage resulting from spacers due to the fact that most of the spacers are arranged under a black matrix. This invention is related to a liquid crystal display having a liquid crystal injected into a gap between two substrates arranged to oppose each other through spacers, wherein at least one of said two substrates is a substrate on which a black matrix is formed; at least one of the two substrates is a substrate constituted by aligning a plurality of transparent electrodes; not less than 50% of the spacers are arranged just under a position of the black matrix; and the spacers arranged just under the position of the black matrix are arranged along the transparent electrodes.

27 Claims, 18 Drawing Sheets

FOREIGN PATENT DOCUMENTS

| | | | |
|---|---|---|---|
| JP | 4-42126 | | 2/1992 |
| JP | 4-204417 | | 7/1992 |
| JP | 4204417 | * | 7/1992 |
| JP | 4-256925 | | 9/1992 |
| JP | 4042126 | * | 12/1992 |
| JP | 5-53121 | | 3/1993 |
| JP | 5-61052 | | 3/1993 |
| JP | 5-66407 | | 3/1993 |
| JP | 5061052 | * | 3/1993 |
| JP | 5066407 | * | 3/1993 |
| JP | 5-150248 | | 6/1993 |
| JP | 5-150249 | | 6/1993 |
| JP | 5-216050 | | 8/1993 |
| JP | 5-333345 | | 12/1993 |
| JP | 5-333346 | | 12/1993 |
| JP | 6-67184 | | 3/1994 |
| JP | 6-250194 | | 9/1994 |
| JP | 6-347806 | | 12/1994 |
| JP | 8-76132 | | 3/1996 |
| JP | 409005755 A | * | 1/1997 |

* cited by examiner

LIQUID CRYSTAL DISPLAY AND METHOD OF MANUFACTURING THE SAME

FIELD OF THE INVENTION

The present invention relates to a liquid crystal display and a liquid crystal display manufacturing method.

BACKGROUND OF THE INVENTION

A liquid crystal display is widely used in a portable electronic device or the like. The liquid crystal display is generally constituted, as shown in FIG. 27, by putting a liquid crystal 7 between two substrates 1 each provided with a color filter 4, a black matrix 5, a linear transparent electrode 3, an alignment film 9 and the like. It is spacers 8 that restrict the distance between said two substrates 1 and maintain the appropriate thickness of a liquid crystal layer.

According to the conventional method of manufacturing a liquid crystal display, since spacers are randomly, uniformly spread onto the substrate on which a pixel electrode is formed, they are arranged even onto the pixel electrode, i.e., the display section of the liquid crystal display. The spacers are generally formed of synthetic resin, glass or the like. If the spacers are arranged onto the pixel electrode, light leakage occurs to the spacer portions due to depolarization. Also, light void occurs due to the irregular orientation of the liquid crystal on the surfaces of the spacers, with the result that contrast and tone are lowered and display quality deteriorates.

Japanese Kokai Publication Sho-60-361 discloses a liquid crystal display cell which reduces the quantity of spacers arranged onto a display section compared with that of spacers arranged onto non-display sections by masking the display section at the time of spreading the spacers. The liquid crystal display cell disclose therein is, however, a simple display system such as a so-called seven-segment display system and spacers are not selectively arranged onto a black matrix portion.

The black matrix is provided to improve the display contrast of a liquid crystal display and to prevent the malfunction of elements due to external light in case of a TFT-type liquid crystal display. To solve the above-stated problems, spacers may be arranged only onto a black matrix portion serving as a light shielding film.

As a technique for arranging spacers only onto a black matrix portion, that is, a portion other than the pixel electrode of a liquid crystal display, Japanese Kokai Publication Hei-4-256925 discloses a method of maintaining the potential of a gate electrode to be the same as that of a drain electrode at the time of spreading spacers. Also, Japanese Kokai Publication Hei-5-53121 discloses a method of applying a voltage to a wiring electrode at the time of spreading spacers. Further, Japanese Kokai Publication Hei-5-61052 discloses a method of applying a positive voltage to a wiring electrode, negatively charging spacers and spreading the resultant spacers in dry condition.

All of the above methods are, however, arrangement-related techniques utilizing a wiring electrode and, therefore, intended for a TFT-type liquid crystal display. An STN-type liquid crystal display does not include an electrode corresponding to the wiring electrode and a pixel electrode is formed simply by making stripe electrodes perpendicular to one another on upper and lower substrates. Owing to this, the above-stated arrangement techniques cannot be applied to the STN-type liquid crystal display.

Furthermore, Japanese Kokai Publications Hei-3-293328 and Hei-4-204417 disclose a method of selectively arranging spacers in areas which are not provided with electrodes by charging one of insulating substrates and spreading spacers charged with the same polarity as that of the electrode onto the insulating substrates.

With this method, however, the spacers are charged with the same polarity as that of the electrode. Due to this, a repulsive force is generated between the spacer and the electrode. However, an attracting force for attracting the spacers to be positioned between the electrodes is not generated. This results in the following disadvantages. That is, only the repulsive force occurs to the spacers in the display area in which a group of electrodes charged with the same polarity as that of the spacers as well as its periphery and the spacers cannot be applied uniformly to areas in which the spacers are intended to be arranged (areas between electrodes) as a result that it is difficult to actively, selectively arrange the spacers.

Furthermore, Japanese Kokai Publication Hei-8-76132 discloses, as a method of arranging spacers with better selectivity than those of the above-stated methods, a method of arranging spacers with good selectivity by charging spacers either positively or negatively, by applying a potential opposite in polarity to that of the spacers to the first electrode provided in areas on an insulating substrate in which the spacers are to be arranged and by applying a potential in the same polarity as that of the spacers to the second electrode provided in areas on the insulating substrate in which the spacers are not to be arranged.

This method, however, has disadvantage in that contrast is decreased since the spacers are arranged on the electrodes. Besides, if this method is applied to a simple matrix liquid crystal display, an electrode for arranging the spacers other than a pixel electrode needs to be formed and numerical aperture thereby decreases.

As can be seen from the above, according to the conventional techniques, it is difficult to easily, efficiently obtain a liquid crystal display with excellent contrast and good display quality by removing spacers on a pixel electrode in a liquid crystal display comprising a substrate having stripe transparent electrodes.

SUMMARY OF THE INVENTION

The object of the present invention is to solve the above problems, i.e., to provide a liquid crystal display exhibiting excellent display quality having good contrast which quality is not influenced by light leakage resulting from spacers due to the fact that most of the spacers are arranged under a black matrix, and to provide a method of manufacturing a liquid crystal display capable of preventing the spacers from being arranged onto pixel electrodes, arranging the spacers onto a black matrix portion and manufacturing a liquid crystal display having extremely high contrast without light leakage resulting from the spacers.

The first invention is a liquid crystal display having a liquid crystal injected into a gap between two substrates arranged to oppose each other through spacers, wherein at least one of said two substrates is a substrate on which a black matrix is formed; at least one of said two substrates is a substrate constituted by aligning a plurality of transparent electrodes; not less than 50% of the spacers are arranged just under a position of the black matrix; and the spacers arranged just under the position of the black matrix are arranged along said transparent electrodes.

The second invention is a method of manufacturing a liquid crystal display wherein spacers are spread onto at least one of a first substrate constituted by aligning a plurality of electrodes and a second substrate arranged on the first substrate to oppose the first substrate and a liquid crystal are injected into a gap between both substrates, which comprises the steps of charging and then spreading the spacers; applying voltages having two or more different voltage values to said plural electrodes; controlling an electric field generated above the transparent electrodes; and thereby selectively arranging the spacers only between predetermined transparent electrodes among the transparent electrodes adjacent each other.

The third invention is a method of manufacturing a liquid crystal display wherein spacers are spread onto a first substrate having a stripe transparent electrode constituted by aligning a plurality of linear transparent electrodes in parallel, a second substrate is arranged above the first substrate to oppose the first substrate and a liquid crystal are injected to a gap between the substrates, wherein spreading said spacers are carried out by applying voltages having different voltage values to said plural linear transparent electrodes aligned in parallel and thereby alternately forming an area having a relatively high potential (+(positive)) and an area having a relatively low potential (−(negative)) on said stripe transparent electrodes; a method of applying the voltages having different voltage values to said linear transparent electrodes is based on a certain application pattern in which at least one of a relatively +(positive) trough (1) and a relatively −(negative) trough (2) in an electric field (electric lines of force) formed based on the voltages having different voltage values applied to said plural linear transparent electrodes is matched with a position of a gap between said plural linear transparent electrodes.

The fourth invention is a method of manufacturing a liquid crystal display wherein spacers are spread onto a first substrate having a stripe linear electrode constituted by aligning a plurality of linear transparent electrodes in parallel, a second substrate is arranged above the first substrate to oppose the first substrate and a liquid crystal are injected into a gap between the substrates, spreading said spacers is curried out by applying voltages having different voltage values to said plural linear transparent electrodes aligned in parallel and thereby alternately forming an area having a relatively high potential (+(positive)) and an area having a relatively low potential (−(negative)); and a method of applying the voltages having different voltage values to said linear transparent electrodes is based on a certain application pattern in which at least one of a position at which electric lines of force formed based on the voltages having different voltage values applied to plural transparent electrodes diverge to both sides and a position at which the electric lines of force formed by the electric lines of force converge from the both sides, is matched with a position of a gap between said plural linear transparent electrodes.

The fifth invention is a method of manufacturing a liquid crystal display wherein spacers are spread onto a first substrate having a stripe transparent electrode constituted by aligning a plurality of linear transparent electrodes in parallel, a second substrate is arranged above the first substrate to oppose the first substrate and a liquid crystal are injected into a gap between the substrates, spreading said spacers is curried out by applying a voltage of a reversed polarity to a polarity of charge of said spacers and a voltage of the same polarity as the polarity of charge of the spacers to said plural linear transparent electrodes aligned in parallel; and a method of applying voltages of reverse and same polarities comprises applying a voltage of the reversed polarity to two linear transparent electrodes, respectively, applying a voltage of the same polarity to one linear transparent electrode and applying voltages so that the arrangement of these adjacent three linear transparent electrode becomes a unit to be repeated, thereby spreading the spacers in the gap between the adjacent two linear transparent electrodes applied with the reversed polarity.

Figure 1:
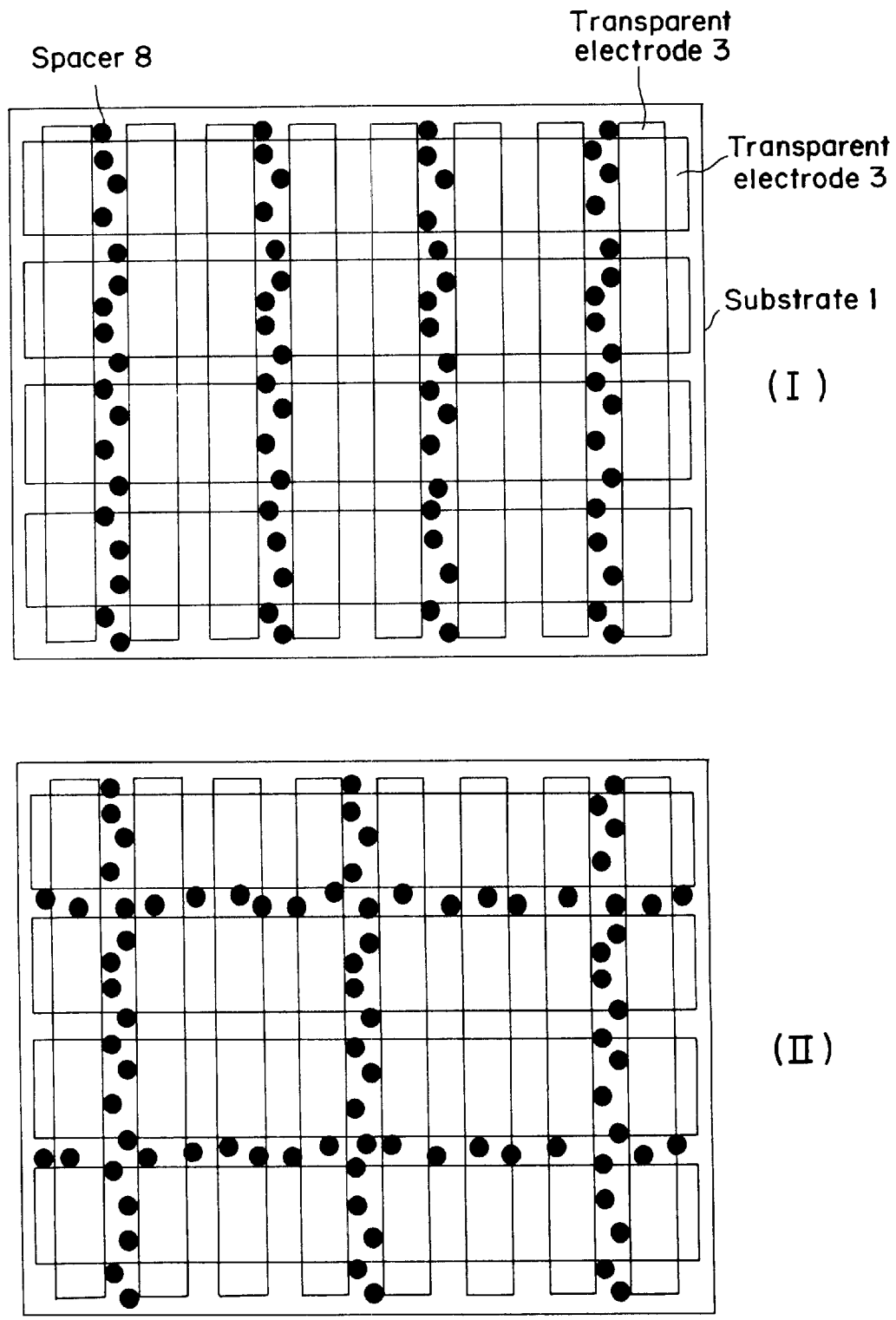
FIG. 1 is a conceptual view showing one example of a liquid crystal display according to the present invention.

EXPLANATION OD THE REFERENCE NUMERALS 1 substrate
2 polarizing plate
3, 3a, 3b, 3c, 3d linear transparent electrode
4 color filter
5 black matrix
6 overcoat
7 liquid crystal
8 spacer
9 alignment film
10 container main body
11 spacer discharging tube
12 voltage applying device
13a, 13b conductive line

DETAILED DESCRIPTION OF THE INVENTION

Now, the present invention will be described in detail.

The first invention is a liquid crystal display having a liquid crystal injected into a gap between two substrates arranged to oppose each other through spacers, wherein at least one of said two substrates is a substrate on which a black matrix is formed; at least one of said two substrate is a substrate on which a plurality of transparent electrodes are aligned; not less than 50% of the spacers are arranged just under a position of the black matrix; and the spacers arranged just under the position of the black matrix are arranged along the transparent electrodes.

The liquid crystal display according to the first invention has a liquid crystal injected into the gap between said two substrates arranged to oppose each other through the spacers, and it is constituted such that at least one of said two substrates is a substrate on which a black matrix is formed and that at least one of said two substrates is a substrate on which a plurality of transparent electrodes are arranged.

The liquid crystal display according to the first invention has a liquid crystal injected into the gap between two substrates arranged to oppose each other through spacers.

The spacers used in the first invention are not specifically limited but may be, for example, inorganic spacers or synthetic resin spacers. Also, the synthetic resin spacers may be light shielding spacers each containing pigment or spacers bonded by heated.

The spacers preferably have a grain size of 1.0 to 20 $\mu$m. If the grain size is less than 1.0 $\mu$m, the pitch of the torsion of a liquid crystal decreases and it becomes thereby difficult to control orientation. If it exceeds 20 $\mu$m, a distance to the alignment film becomes long and the influence of light leakage may be greatly extended or visually recognized.

The substrates used in the first example are not specifically limited but may be, for example, transparent substrates formed of glass, synthetic resin or the like.

At least one of said two substrates is a substrate constituted by aligning a plurality of transparent electrodes.

The transparent electrodes are not specifically limited but may be, for example, linear transparent electrodes. Also, a stripe transparent electrode composed of the linear transparent electrodes aligned in parallel can be formed on the substrate.

The stripe transparent electrode is used as a so-called display electrode in the liquid crystal display.

In addition, at least one of said two substrates may be a substrate on which a color filter or a black matrix is formed.

In the liquid crystal display according to the first invention, not less than 50% of the total number of the spacers are arranged just under the position of the black matrix. In case of less than 50%, the effect of enhancing contrast is little. Not less than 65% thereof is preferable.

In this specification, the position just under the black matrix means a position other than that of the display section in the liquid crystal display. In the liquid crystal display according to the present invention, since at least one of said two substrates is a substrate on which the stripe transparent electrode is formed, the position indicates the gap between a plurality of linear transparent electrodes constituting said stripe transparent electrode.

Said spacers arranged just under the position of the black matrix are arranged linearly in parallel to said linear transparent electrodes constituting the stripe transparent electrode. That is, the spacers are arranged linearly in the gaps between said plural linear transparent electrodes constituting the stripe transparent electrode. In this case, the spacers may be arranged in all of the gaps between the plural linear transparent electrodes constituting the stripe transparent electrode. However, in view of the number of spacers to be arranged, the properties such as hardness and the like, spacers are not necessarily arranged in all of the gaps and may be arranged at certain intervals such as every other electrode, every three electrodes, every four electrodes or every five electrodes.

According to the first invention, the number of said spacers is preferably 20 to 500 on average per $mm^2$ of a liquid crystal display surface. That is, when the liquid crystal display according to the present invention is manufactured, the number of spacers to be spread onto a substrate is preferably 20 to 500 on average per $mm^2$ of the substrate. If the number is less than 20, it is hard to keep cell gaps uniform. If it exceeds 500, cell gaps can be kept but the number of spacers arranged onto the display section increases to thereby make it difficult to enhance contrast. More preferable is 50 to 250. As will be described later, when spacers are spread and arranged onto both of said two substrates, the total number of the spacers should fall within the above range.

The distance between the lines of said spacers arranged linearly is preferably not more than 5 mm. If it exceeds 5 mm, the substrates formed of glass or the like may undulate to cause display deficiency. More preferably, the distance is not more than 1.5 mm.

The first example of the liquid crystal display according to the first invention is, for example, a liquid crystal display, as shown in FIG. 1(I), wherein a stripe transparent electrode is formed on each of two substrates and spacers are arranged linearly onto one of said two substrates on which a stripe transparent electrode is formed.

The second example of the liquid crystal display according to the first invention is, for example, a liquid crystal display, as shown in FIG. 1(II), wherein a stripe transparent electrode is formed on each of said two substrates, spacers are arranged linearly onto each of said two substrates on which a stripe transparent electrode is formed and the directions of the stripe transparent electrodes formed on said two substrates are perpendicular to each other.

The liquid crystal displays in the first and second examples are so-called STN type liquid crystal displays. That is to say, spacers are arranged onto either or both of the substrate on which a segment electrode of the STN-type liquid crystal display is formed and that on which a common electrode is formed.

Figure 2:
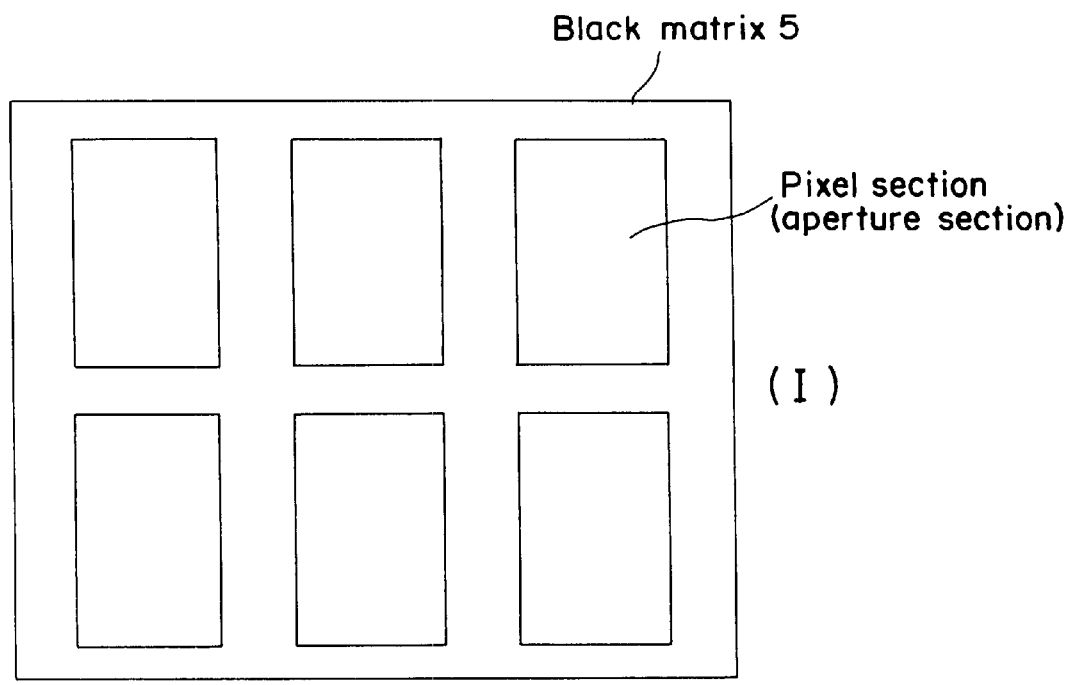
FIG. 2 is a conceptual view showing a black matrix used in the liquid crystal display according to the present invention.
Figure 2:
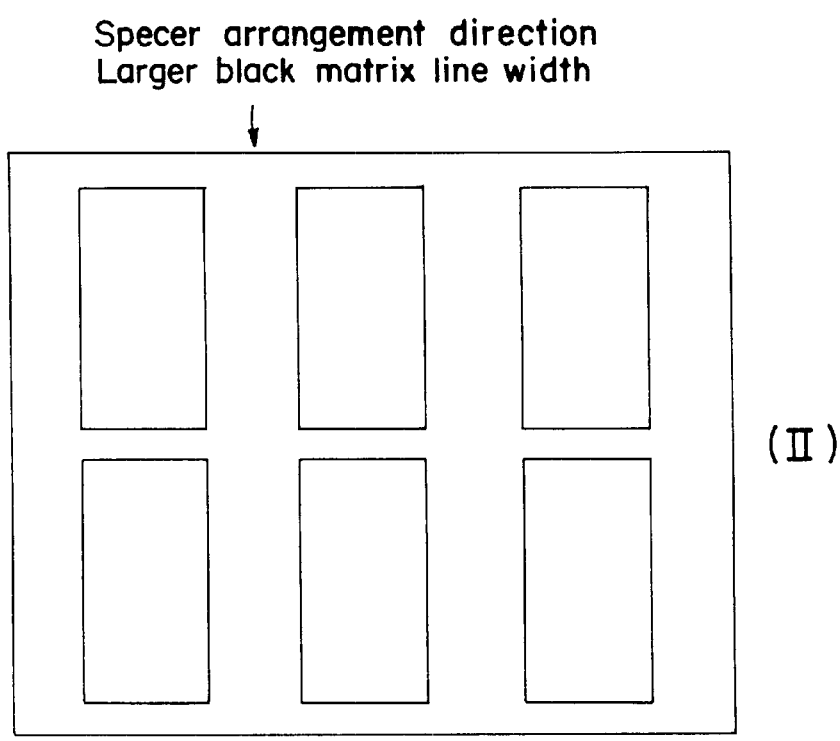

The black matrix of the first invention is, as shown in FIG. 2(I), generally a grid-like matrix having aperture sections functioning as pixel sections, i.e., display sections for the liquid crystal display. To enhance the display quality of the liquid crystal display according to the present invention, the black matrix used herein may be such that the line width in the direction of spacers arranged linearly is larger than the line width in perpendicular direction as shown in FIG. 2(II). By doing so, the number of spacers arranged just under the position of the black matrix increases and it is, therefore, possible to reduce light leakage and the like caused by the spacers. In that case, if the line width of the black matrix in one direction is simply increased, the numerical aperture decreases. For that reason, it is preferable that the numerical aperture is the same as the conventional one by narrowing the line width in perpendicular direction.

The third example of the liquid crystal display according to the first invention is, for example, a liquid crystal display wherein only one of said two substrates has a stripe transparent electrode formed thereon and the other substrate has a thin film transistor formed thereon.

The liquid crystal display in the third example is a so-called TFT-type liquid crystal display. Generally, in the TFT-type liquid crystal display, a thin film transistor is formed on one substrate, whereas a solid transparent electrode is formed on a color filter-side substrate opposing to the former substrate. Due to this, as in the case of the STN-type liquid crystal display, if a TFT-type liquid crystal display is constituted by using the solid transparent electrode formed on the color filer-side substrate as a stripe transparent electrode composed of a plurality of linear transparent electrodes, arranging spacers in the gaps between the linear transparent electrodes and laminating two substrates with each other, then the advantage of the present invention can be fulfilled. When the TFT-type liquid crystal display constituted as mentioned above is actually driven, the same voltage is applied to the respective linear transparent electrodes, whereby the pixel sections show the same advantage as that of the solid electrode and images can be displayed in the same manner as the conventional TFT-type liquid crystal display.

Since the liquid crystal display according to the first invention has the above-stated structure, most of the spacers are arranged below the black matrix and display operation is less influenced by light leakage resulting from the spacers, if any, and good display quality is exhibited. Further, the liquid crystal display according to the first invention can be used as an STN-type liquid crystal display, a ferroelectric liquid crystal display or a TFT-type liquid crystal display.

The electrode used in the present invention is not limited to a linear electrode but an electrode of pictorial character display type can be used in the present invention.

The second invention is a method of manufacturing a liquid crystal display wherein spacers are spread onto at least one of a first substrate constituted by aligning a plurality of electrodes and a second substrate arranged on the first substrate to oppose the first substrate and a liquid crystal are injected into a gap between the both substrates, which comprises the steps of charging and then spreading the spacers; applying voltages having two or more different voltage values to said plural electrodes; controlling an electric field generated above the electrodes; and thereby selectively arranging the spacers only between predetermined electrodes among the electrodes adjacent each other.

The liquid crystal display, spacer, substrate and electrodes composing thereof in the second invention are the same as those described in the first invention.

It is noted that the quantity of charge of spacers can be forcedly increased by mixing iron powder carriers or the like in the spacers.

Figure 3:
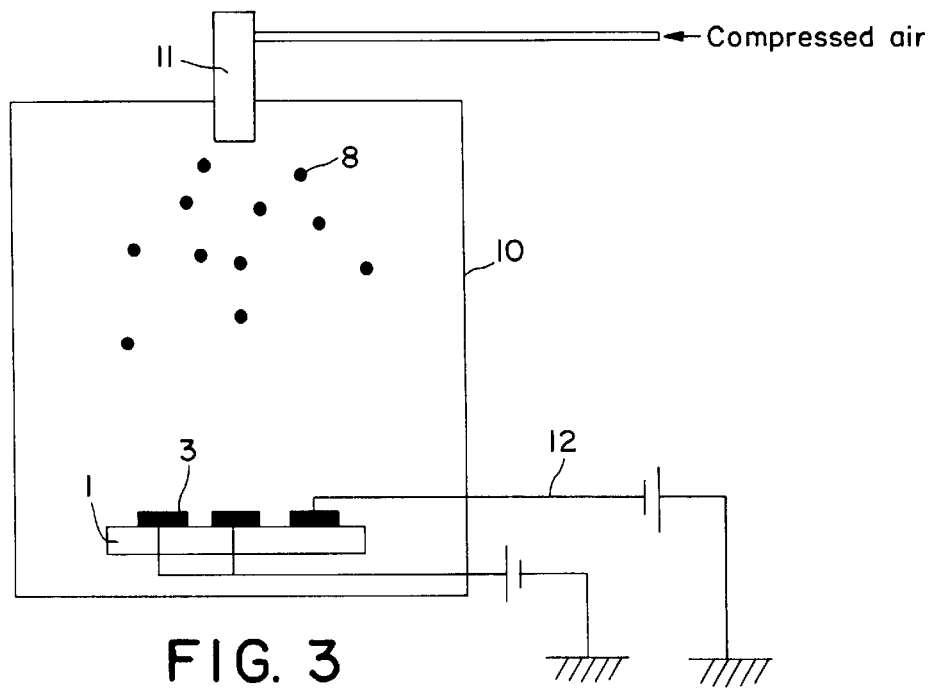
FIG. 3 is a conceptual view for describing a liquid crystal display manufacturing method according to the present invention.

FIG. 3 is a cross-sectional view of a spacer applicator used in the second invention.

In the production of a liquid crystal display, spacers are generally spread by, as shown in FIG. 3, splashing an appropriate quantity of spacers by means of compressed air, nitrogen gas or the like and spreading them onto substrates. Spreading the spacer may be either a dry system or a wet system. The wet spreading system is to distribute spacers into a mixture liquid such as water or alcohol and spreading them. Even with this system, spacers are charged and the advantage of the present invention is not reduced. However, the larger the quantity of charge of spacers is, the higher the arrangement accuracy becomes. Thus, the dry spreading system is preferable to the wet system. By spreading the spacers, they are repeatedly contacted (collided) with piping walls and then charged. The spacers may given potentials and be charged by a charging unit. Therefore, if a certain pattern of electric lines of force is formed on the substrate on which the spacers are spread, the arrangement of the charged spacers is controlled. The liquid crystal display manufacturing method according to this invention is designed to take control of the arrangement of spacers by such a function.

Generally, if two types of voltages having different voltage values are applied to two electrodes formed on a plane, respectively, an area having a relatively high potential (+(positive)) and that having a relatively low potential (−(negative)) are generated and electric lines of force are generated by the potential difference. Namely, even if it is assumed that the voltages applied to two electrodes have the same polarity with reference to an earth potential (ground potential) (0), the potential difference exists between them. If so, one of the electrodes becomes a relatively +(positive) electrode to form a relatively high potential (+(positive)) area and the other electrode becomes a relatively −(negative) electrode to form a relatively low potential (−(negative)) area. At this moment, electric lines of force are formed from the electrode of a relatively +(positive) potential to that of a relatively −(negative) potential. If charged grains are carried into the electric field on which such electric lines of force are formed and the charged grains are charged +(positive), they are given a force in the direction of the electric lines of force. If charged −(negative), the charged grains are given a force in the direction opposite to that of the electric lines of force.

In the liquid crystal display manufacturing method according to the second invention, voltages having two or more different voltage values are applied to a plurality of electrodes aligned with one another mentioned above and an electric field generated above said electrodes is controlled, whereby repulsive forces and attracting forces acting on the charged spacers are controlled, a trough of a synthetic force of repulsive forces and a crest of a synthetic force of attracting forces or a crest of the attraction force in a synthetic force of a repulsive force and an attracting force is formed between predetermined electrodes among adjacent electrodes and said spacers are selectively arranged between the predetermined electrodes.

Figure 4:
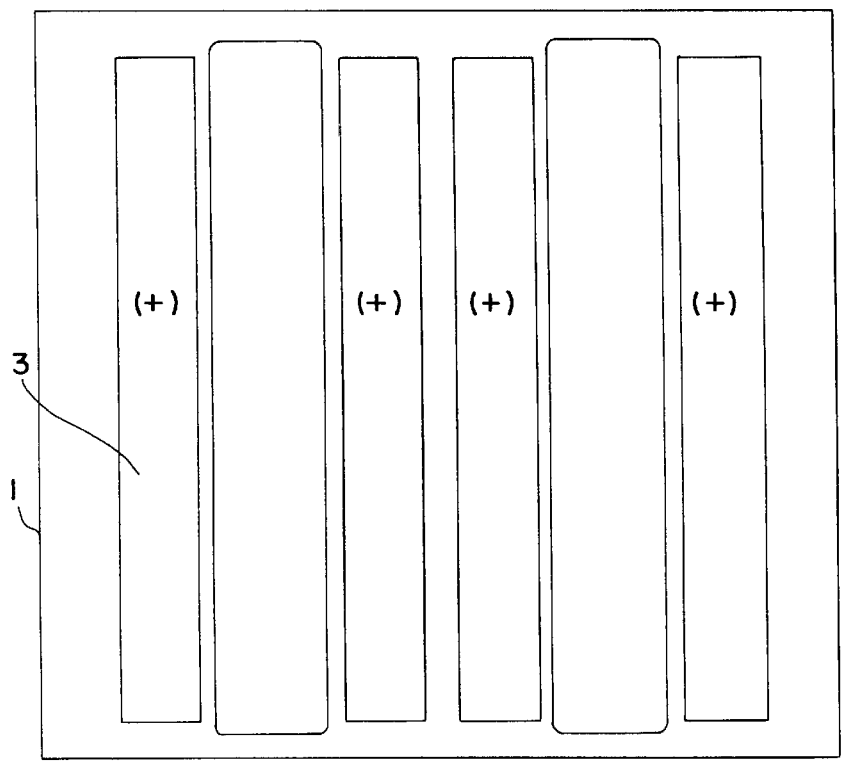
FIG. 4 is a conceptual view showing an area having relatively a high potential (+(positive)) formed on stripe transparent electrodes and an area having relatively a low (−(negative)), showing the stripe transparent electrodes from above.

More specifically, in the liquid crystal display manufacturing method according to the second invention, voltages having different voltage values are applied to a plurality of aligned electrodes, so that electrodes having a relatively +(positive) potential and those having a relatively −(negative) potential are generated, whereby an area having a relatively high (+(positive)) potential and that having a relatively low (−(negative)) potential are alternately formed as shown in FIG. 4. It is noted that the number of types of voltages having different voltage values may be two or not less than two. If there are three or more types of voltages having different values, it is difficult to form an electrode pattern. It is, therefore, preferable that the number of types of voltages having different voltage values is two. Further, the types of voltages applied to the electrodes are not specifically limited. For example, DC voltage, pulse voltage or the like is appropriately used for this purpose.

According to the method of applying voltages having different voltage values to the electrodes, the electric field (electric lines of force) formed based on the voltages having different voltage values applied to a plurality of electrodes is based on a certain application pattern in which the positions at which attracting forces act on the spacers most strongly and/or the positions at which repulsive forces act on the spacers most weakly are matched with the positions of the gaps between said plural electrodes.

Said position at which attracting forces act on the spacers most strongly corresponds to a position on a crest of a synthetic force of attracting forces generated between predetermined electrodes among the adjacent electrodes or to a position on a crest of an attracting force in a synthetic force formed by repulsive forces and attracting forces, at which point the attracting forces act on the spacers most strongly. The position at which the attracting forces act on the spacers most weakly corresponds to a position on a trough of a synthetic force of repulsive forces generated between predetermined electrodes among the adjacent electrodes or a trough of a repulsive force in a synthetic force formed by repulsive forces and attracting forces, at which position the repulsive forces act on the spacers most weakly.

Furthermore, since the predetermined electrodes between which the spacers are selectively arranged are also the adjacent electrodes applied with the same potential, repulsive forces or attracting forces equally act on the spacers moved to the trough of a synthetic force of repulsive forces, the crest of a synthetic force of repulsive forces or the crest of an attracting force in a synthetic force formed by repulsive forces and attracting forces, by giving potentials of two or higher different voltage values to the electrodes, respectively. If the repulsive forces act on the spacers, the spacers can be selectively arranged only between predetermined electrodes in high probability in a manner that the spacers are pushed by the equal repulsive forces given from two predetermined adjacent electrodes. If the attracting forces act on the spacers, the spacers can be selectively arranged only between predetermined electrodes in high probability in a manner that the spacers are attracted by the equal attracting forces given from two predetermined adjacent electrodes.

Furthermore, if said spacers are charged positively, the predetermined electrodes between which the spacers are selectively arranged are those giving a voltage of the lowest potential among voltages having two or more voltage values applied to said plural electrodes. If the spacers are charged negatively, the predetermined electrodes are those applied with a voltage of the highest potential among voltages having two or more voltage values applied to said plural electrodes. Hence, it is possible to create a trough of a synthetic force of repulsive forces, a crest of a synthetic force of attracting forces or a crest of a repulsive force in a synthetic force formed by repulsive forces and attracting forces between the predetermined electrodes.

That is, repulsive forces act on the positively charged spacers most weakly when the lowest potential given to said predetermined adjacent electrodes is positive. Attracting forces act on the positively charged spacers most strongly when the lowest potential given to said predetermined adjacent electrodes is negative. In these cases, the positively charged spacers are moved between the electrodes given the lowest potential. Attracting forces act on the negatively charged spacers most strongly when the highest potential given to said predetermined adjacent electrodes is positive. Repulsive forces act on the negatively charged spacers most weakly when the highest potential given to said predetermined adjacent electrodes is negative. In these cases, the negatively charged spacers are moved between the electrodes given the highest potential. Accordingly, it is possible to selectively arrange the spacers only between the predetermined electrodes in higher probability.

Moreover, if said spacers are positively charged, the lowest potential is negative. If said spacers are negatively charged, the highest potential is positive. In these cases, by the action of the attracting forces generated between said electrodes having a predetermined distance each other and spacers, the spacers are moved to a crest of a synthetic force of repulsive forces generated between the predetermined electrodes or to a crest of attraction forces in a synthetic force formed by repulsive forces and attraction forces and the spacers are attracted by the equal attracting forces given from the predetermined two adjacent electrodes. Thus, the spacers can be selectively arranged only between the predetermined electrodes in far higher probability.

Additionally, in the case that the potentials other than the lowest or highest potential have the same polarity as that of the spacers, by the action of the attracting forces generated between the electrodes having a predetermined distance each other and the spacers and the action of the repulsive forces generated between the other electrodes and the spacers, the spacers are pushed by the repulsive forces generated between said other electrodes and the spacers and attracted by the attraction forces generated between the predetermined adjacent electrodes and the spacers, whereby the spacers are moved to a crest of repulsive forces in a synthetic force formed by repulsive forces and attracting forces generated between said predetermined electrodes and further attracted by the equal repulsive forces given from the predetermined two adjacent electrodes. Therefore, it is possible to selectively arrange the spacers only between the predetermined electrodes in far higher probability.

Moreover, in the case that the polarity of the potential charging the spacers is the same as that of the other two or more different potentials applied to the plural electrodes by the action of strong repulsive force generated between the electrodes other than said predetermined adjacent electrodes and the spacers and that of weak repulsive forces generated between said predetermined adjacent electrodes and the spacers, the spacers are pushed by the strong repulsive forces generated between the other electrodes and the spacers and moved to a trough of a synthetic force of repulsive forces generated between the predetermined electrodes, and further the spacers are generated between the predetermined electrodes by repulsive forces. Therefore, it is possible to selectively arrange the spacers only between the predetermined electrodes in far higher probability.

With this structure, in particular, the spacers are arranged between the predetermined electrodes while being pushed by repulsive forces. Therefore, they can be arranged at the central portion between the predetermined electrodes in a concentrated manner. It is, therefore, possible to decrease the probability that the spacers are arranged on the edge portions of the predetermined adjacent electrodes.

The third invention is a method of manufacturing a liquid crystal display wherein spacers are spread onto a first substrate having a stripe transparent electrode constituted by aligning a plurality of linear transparent electrodes in parallel, a second substrate is arranged above the first substrate to oppose the first substrate and a liquid crystal are injected to a gap between the substrates, wherein spreading the spacers is carried out spread by applying voltages having different voltage values to said plural linear transparent electrodes aligned in parallel and thereby alternately forming an area having a relatively high potential (+(positive) and an area having a relatively low potential (−(negative)); a method of applying the voltages having different voltage values to the linear transparent electrodes is based on a certain application pattern in which at least one of a relatively +(positive) trough (1) and a relatively −(negative) trough (2) in an electric field (electric lines of force) formed based on the voltages having different voltage values applied to said plural linear transparent electrodes is matched with a position of a gap between said plural linear transparent electrodes.

The liquid crystal display, spacers, substrates and constituent stripe transparent electrodes according to the third invention may be the same as those described in the first and second inventions.

In the liquid crystal display manufacturing method according to the third invention, voltages having different voltage values are applied to a plurality of linear transparent electrodes aligned in parallel to generate electrodes having a relatively +(positive) potential and those having a relatively −(negative) potential between the plural linear transparent electrodes and to thereby alternately form an area having a relatively high potential (+(positive)) and that having a relatively low potential (−(negative)) as shown in FIG. 4.

Figure 5:
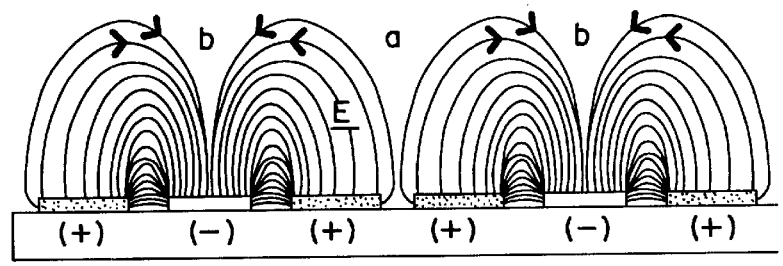
FIG. 5 is a conceptual view showing electric lines of force formed by areas having potential difference shown in FIG. 4 and showing the stripe transparent electrodes from side.

The areas having potential difference as shown in FIG. 4 form an electric field (electric lines of force) shown in FIG. 5. According to the third invention, the method of applying the voltages having different voltage values to the linear transparent electrodes is based on a certain application pattern in which at least one of a trough (1) having a relatively +(positive) potential and a trough (2) having a relatively −(negative) potential in the electric lines of force thus formed is matched with the position of the gap between the plural linear transparent electrodes. It is noted that the trough (1) having a relatively +(positive) potential indicates trough a shown in FIG. 5 and the trough (2) having a relatively −(negative) potential indicates a trough b shown in FIG. 5. In FIG. 5, the position of the trough (1) having a relatively +(positive) potential is matched with the position of the gap between the plural linear transparent electrodes.

The fourth invention is a method of manufacturing a liquid crystal display wherein spacers are spread onto a first substrate having a stripe linear electrode constituted by aligning a plurality of linear transparent electrodes in parallel, a second substrate is arranged above the first substrate to oppose the first substrate and a liquid crystal are injected into a gap between the substrates, spreading said spacers is curried out by applying voltages having different voltage values to said plural linear transparent electrodes aligned in parallel and thereby alternately forming an area having a relatively high potential (+(positive)) and an area having a relatively low potential (−(negative)); and a method of applying the voltages having different voltage values to the linear transparent electrodes is based on a certain application pattern in which at least one of a position at which electric lines of force formed based on the voltages having different voltage values applied to said plural transparent electrodes diverge to both sides and a position at which the electric lines of force formed by the electric lines of force converge from the both sides, is matched with a position of a gap between said plural linear transparent electrodes.

The liquid crystal display, spacers, substrates and constituent stripe transparent electrode may be the same as those described in the first, second and third inventions.

According to the fourth invention as in the case of the third invention, voltages having different voltage values are applied to a plurality of linear transparent electrodes aligned in parallel to generate electrodes having a relatively +(positive) potential and those having a relatively −(negative) potential between the plural linear transparent electrodes and to thereby alternately form an area having a relatively high potential (+(positive)) and that having a relatively low potential (−(negative)) on the stripe transparent electrode comprises said plural linear transparent electrodes as shown in FIG. 4.

The areas having potential difference as shown in FIG. 4 form an electric lines of force shown in FIG. 5. According to the fourth invention, the method of applying the voltages having different voltage values to the linear transparent electrodes is based on a certain application pattern in which at least one of a position at which the electric lines of force formed as mentioned above diverge to both sides and that at which said electric lines of force converge from the both sides is matched with the position of the gap between the plural linear transparent electrodes. It is noted that the position at which the electric lines of force diverge to the both sides indicates a position a shown in FIG. 5 and the position at which the electric lines of force converge from the both sides indicates a position b shown in FIG. 5. In FIG. 5, the position at which the electric lines of force diverge is matched with that of the gap between the plural linear transparent electrodes.

According to this invention, the method of applying voltages having different voltage values to the electrodes may be, for example, a method conducted based on a certain application pattern in which not less than one type of a voltage higher than a certain voltage is applied to a plurality of voltages aligned and not less than one type of a voltage lower than a certain voltage is applied to not less than one electrode in front of and back of, i.e., adjacent to the plural electrodes.

In addition, if the application method is conducted based on a certain application pattern in which not less than one type of a voltage not less than a certain voltage (V1) is applied to a plurality of linear transparent electrodes aligned and not less than one type of a voltage not more than a certain voltage (V2) is applied to not less than one linear transparent electrode in front of or back of, i.e., adjacent to said plural linear transparent electrodes, the number of the plural linear transparent electrodes is even and said voltages V1 and V2 satisfy the relationship:

V2<V1, then electric lines of force are formed from the linear transparent electrodes applied with a voltage not less than the voltage V1 to those applied with a voltage not more than the voltage V2. Owing to this, the position at which the electric lines of force diverge to the both sides exist among the even number of linear transparent electrodes applied with the voltage not less than the voltage V1 and the position at which electric lines of force formed based on the above electric lines of force converge from the both sides exist on the linear transparent electrodes applied with the voltage of not more than the voltage V2.

In this case, the number of linear transparent electrodes applied with the voltage not less than the voltage V1 may be two or more if there are a plurality of linear transparent electrodes.

Further, the potential difference between the voltages V1 and V2 is preferably several volts to several kilovolts. More preferably, the difference is several volts to several hundred volts. If the potential difference is too large, short-circuit occurs between the electrodes. If too small, spacer arrangement accuracy is lowered.

It is also possible that one of the voltages V1 and V2 is at an earth potential (ground potential).

If the polarity of charge of the spacers to be spread is −(negative), the spacers are given a force opposite indirection to the above-stated electric lines of force (F=QE, where Q denotes the quantity of charge of the spacers and E denotes an electric field) and arranged to positions at which the electric lines of force diverge to the both sides, i.e., arranged in the gaps between the even number of linear transparent electrodes applied with voltage V1.

Figure 6:
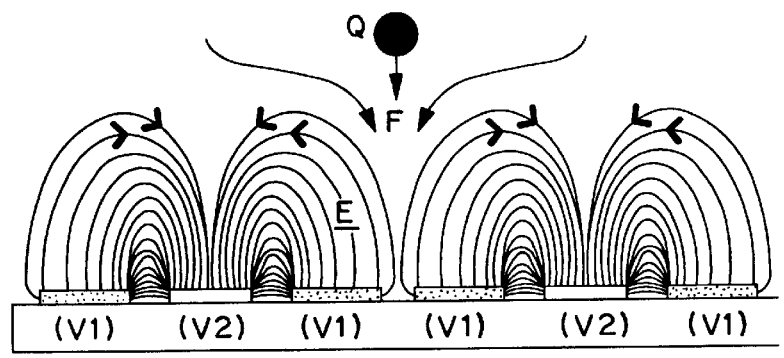
FIG. 6 is a conceptual view for describing a liquid crystal display manufacturing method according to the present invention.

Additionally, if the relationship of V1 and V2 is represented by:

V1<V2, then the electric lines of force are formed from the linear transparent electrodes applied with a voltage not less than the voltage V2 to those applied with a voltage not more than the voltage V1. As a result, positions at which the electric lines of force diverge to the both sides exist on the linear transparent electrodes applied with the voltage not less than the voltage V2 and positions at which electric lines of force formed based on the above electric lines of force converge from the both sides exist between the even number of linear transparent electrodes applied with the voltage not more than V1. In other words, the electric lines of force have opposite orientations in FIG. 6.

Now, if the polarity of charge of the spacers to be spread is +(positive), the spacers are given a force in the same direction as that of the electric lines of force and arranged at the positions at which electric lines of force formed based on the above electric lines of force converge from the both sides, i.e., arranged in the gaps between the even number of linear transparent electrodes applied with a voltage not more than the voltage V1.

The quantity, polarity and the like of the charged spacers can be checked by using a unit such as E-SPART (Hosokawa Micron Corporation) or the like. The polarity can be easily checked by spreading spacers in a state in which the linear transparent electrodes are applied with a +(positive) or −(negative) voltage and by checking the direction of the movement of the spacers at that time.

If the spacers are charged negatively (−) with respect to the earth potential (ground potential), it suffices that the voltages V1 and V2 maintain the relationship of V2<V1. The polarity of the voltage V1 may be +(positive) and that of the voltage V2 maybe −(negative). Both the polarity of the voltage V1 and that of the voltage V2 may be +(positive) or −(negative). Alternatively, one of the voltages V1 and V2 may be at the earth potential (ground potential). For example, even if the polarity of charge of the spacers is −(negative) and the polarity of both the voltages V1 and V2 is −(negative), the spacers can be arranged without being repulsed due to the influence of the electric lines of force although the number of spacers arriving onto the substrates may slightly decrease. Even if the polarity of charge of the spacers is +(positive), the polarities of the voltages V1 and V2 do not matter as long as the voltages V1 and V2 satisfy the relationship of V1<V2.

The above-stated voltage application conditions are appropriately determined based on the distance between the linear transparent electrodes to be used, the quantity of charge of the spacers and the like.

There are cases where spacer arrangement accuracy may enhance by making the potential difference larger and thereby followed the spacers along the electric line of force as possible while the potential of the voltage V1 is opposite to that of the charged spacers.

Further, there are cases where spacer arrangement accuracy enhances while the voltages V1 and V2 have the same polarity as that of charged spacers and thereby the spacer can be arranged at the central portions of the gaps among the linear transparent electrodes applied with voltage V1 in a concentrated manner. For example, even if the polarity of charge of the spacers is −(negative), the potential difference of 100V is formed with the same polarity as that of the charged spacers by setting said V2 at −1100V and said V1 at −1000V rather than by setting voltage 2 at 0V and voltage 1 at 100V to make the potential difference of 100V with the reversed polarity to that of the charged spacers. The reason is considered as follows; if the potential difference is formed while having a reversed polarity to that of the charged spacers, the spacers are first influenced by the attracting force remotely from the substrates and the falling speed tends to be faster; if the potential difference is formed while having the same polarity as that of the charged spacers, the spacer falling speed tends to be suppressed by the influence of the repulsive force. Therefore, the inertial force acting on the spacers varies, with the result that the behavior of the spacers along the electric lines of force varies accordingly.

According to the second, third and fourth inventions, spacers are not necessarily spread in all of the gaps between the plural linear transparent electrodes. That is, when spacers are spread first time, they are arranged only in the gaps among the even number of linear transparent electrodes applied with a voltage not less than voltage V1 or not more than V1. The number, position and the like of the spacers to be arranged necessary for a liquid crystal display are appropriately determined depending on the hardness and the like of the spacers to be used. If the spacers are not sufficiently arranged by spreading the spacer of the first time, it is preferable that spacers are spread a plurality of times.

Spreading the spacers a plurality of times can be conducted by the repeated spreading operations while continuously moving a certain application pattern along the linear transparent electrodes.

Figure 7:
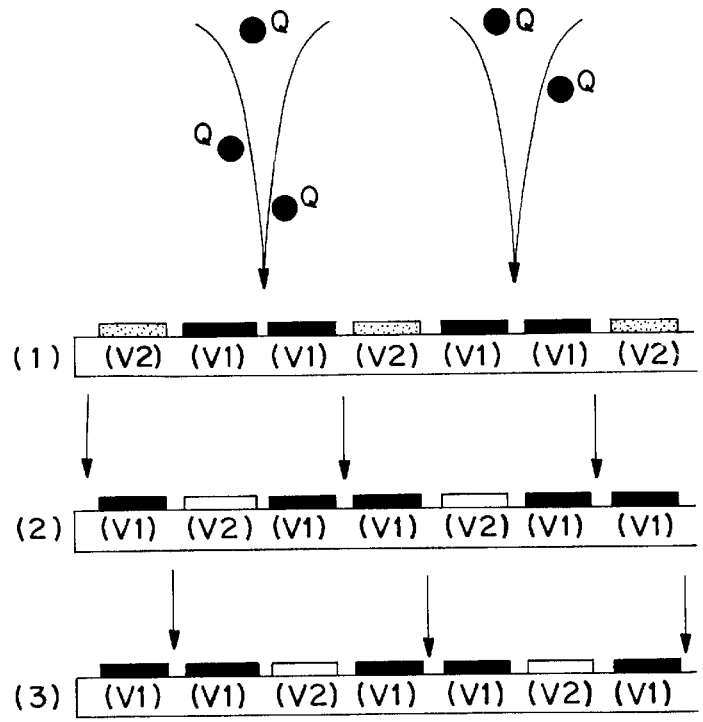
FIG. 7 is a conceptual view for describing one example of a liquid crystal display manufacturing method according to the present invention.

For example, as shown in FIG. 7 (1), (2) and (3), a certain application pattern is continuously moved while maintaining the pattern and the spreading the spacers is repeatedly carried out, thereby making it possible to arrange the spacers in all of the gaps among the linear transparent electrodes.

Furthermore, the above-stated application of spacers a plurality of times can be executed by repeating carrying out the application while changing a certain application pattern to other patterns.

For example, if between the plural linear transparent electrodes, those having a relatively +(positive) potential and those having a relatively −(negative) potential are indicated by "+" and "−" respectively, the application of spacers of the first time is carried out in the following pattern:

−++++−−++++− . . . , and that of the second time is carried out in the following pattern:

−++−++−++ . . . , then it is possible to arrange spacers at different positions between the first time and the second time.

According to the second, third and fourth inventions, voltage can be applied to the respective linear transparent electrodes by using a fine conductive protrusion and the like such as a prober.

According to the liquid crystal display manufacturing methods of the second, third and fourth inventions, the application of voltages, for example, to not less than one of the linear transparent electrodes to be applied with not less than two different potentials can be conducted by a conductive line which is a common conductive line provided to make the respective linear transparent electrodes continuous to one or both ends of the respective linear transparent electrodes.

For example, the application of voltages to linear transparent electrodes can be appropriately carried out by the method in which the application of voltages to linear transparent electrodes to be applied with not less than one type of a voltage not less than the voltage V1 is carried out by a conductive line, thus a common conductive line provided to make the respective linear transparent electrodes continuous to one end of both ends of the respective linear transparent electrodes, and the application of voltages to linear transparent electrodes to be applied with not less than one type of a voltage not more than the voltage V2 by a conductive line, thus a common conductive line provided to make the respective linear transparent electrodes continuous to the other end of the both ends of the respective linear transparent electrodes.

Furthermore, the application of voltages to linear transparent electrodes can be appropriately carried out by the method in which the application of voltages to linear transparent electrodes to be applied with not less than one type of a voltage not more than the voltage V1 is carried out by a conductive line, thus a common conductive line provided to make the respective linear transparent electrodes continuous to one end of both ends of the respective linear transparent electrodes and the application of voltages to linear transparent electrodes to be applied with not less than one type of a voltage not less than the voltage V2 by a conductive line, thus a common conductive line provided to make the respective linear transparent electrodes continuous to the other end of the both ends of the respective linear transparent electrodes.

Figure 8:
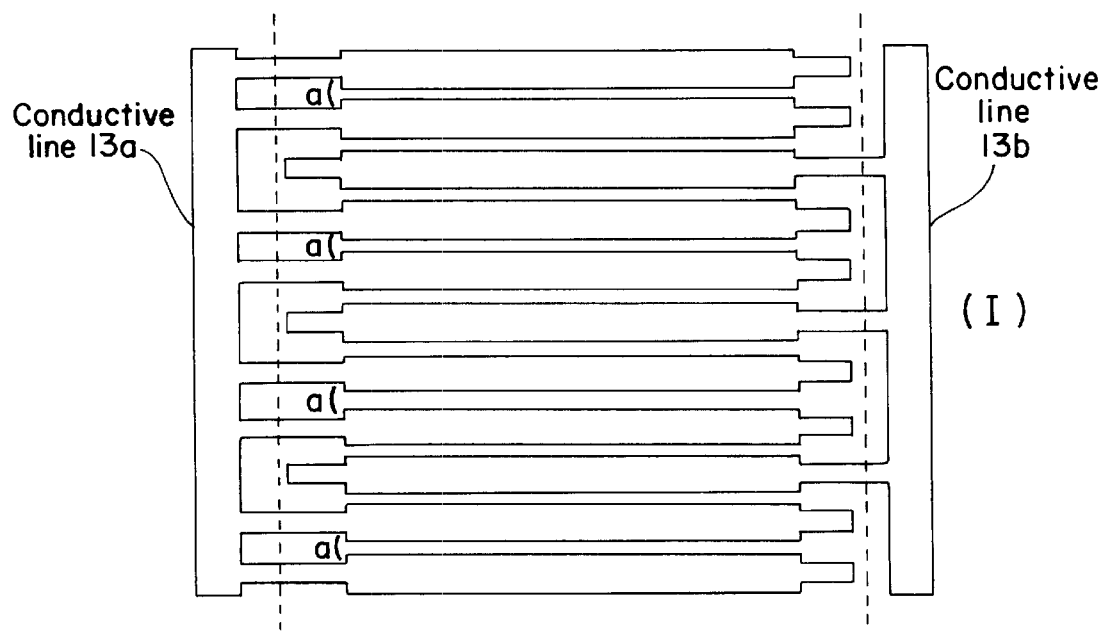
FIG. 8 is a schematic view of a comb-shaped electrode used in one example of a liquid crystal display manufacturing method according to the present invention.
Figure 8:
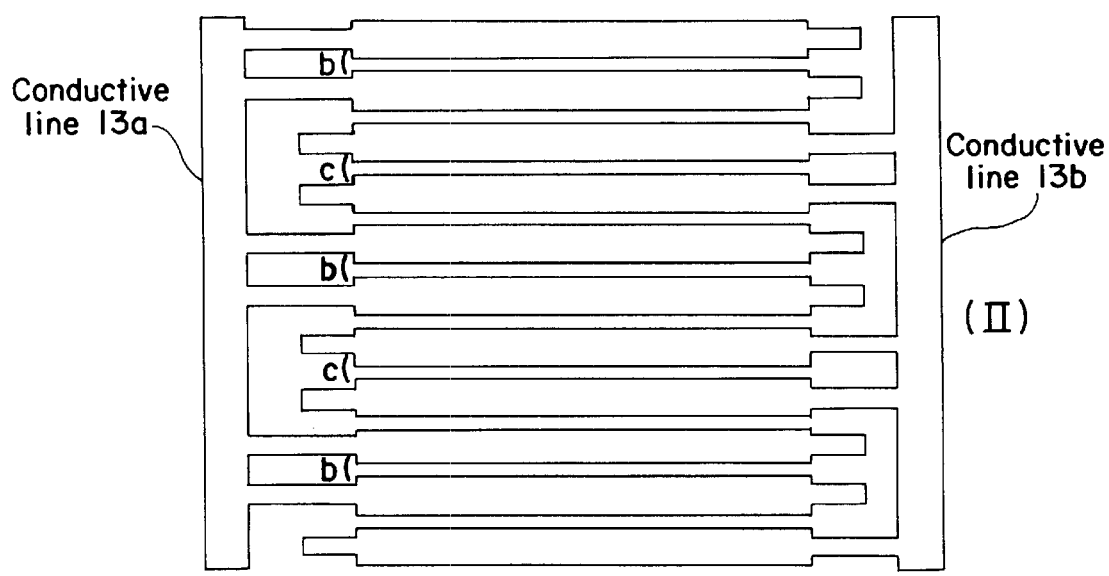
Figure 9:
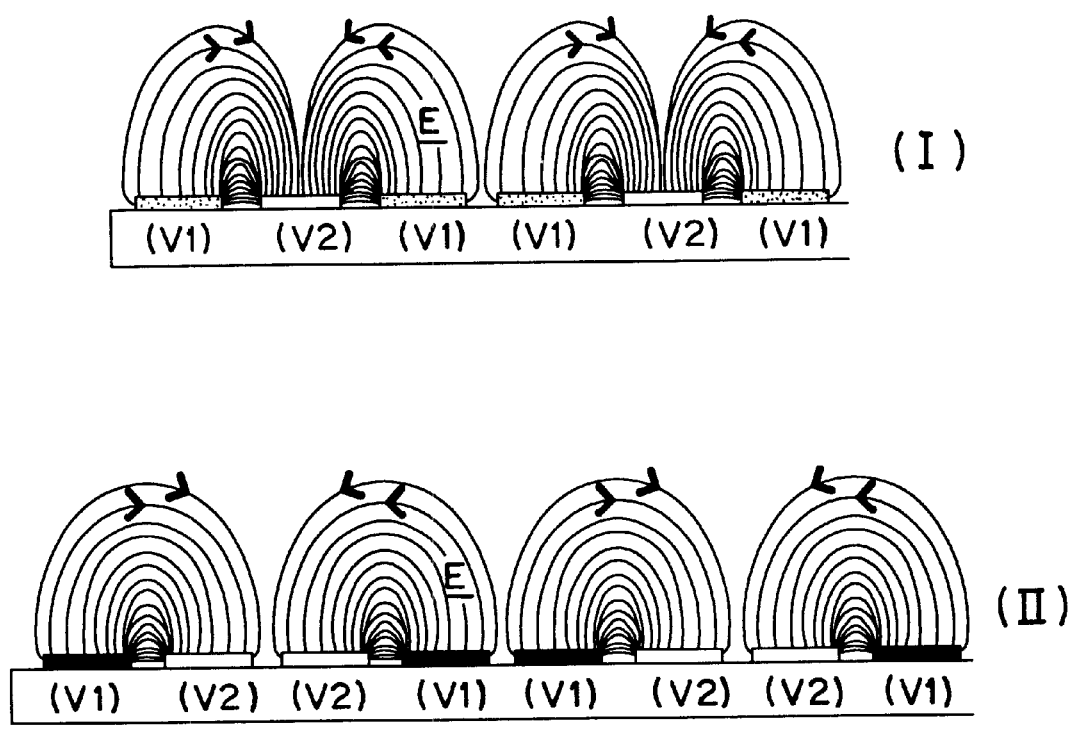
FIG. 9 is a conceptual view showing electric lines of force formed by the comb-shaped electrode used in one example of a liquid crystal display manufacturing method according to the present invention.

For example, the voltage V1 is applied to a conductive line A and the voltage V2 is applied to a conductive line B using a comb-shaped electrode of 2:1 structure as shown in FIG. 8 (I), thereby making it possible to arrange the spacers in gaps a. After the spacers are arranged, the conductive lines A and B are cut along broken lines shown in FIG. 8(I) to thereby provide a stripe transparent electrode. It is noted that the comb-shaped electrode of 2:1 structure shown in FIG. 8(I) forms electric lines of force shown in FIG. 9(I).

Additionally, the voltage V1 is applied to a conductive line A and the voltage V2 is applied to a conductive line B using a comb-shaped electrode of 2:2 structure as shown in FIG. 8(II), thereby making it possible to arrange the spacers in gaps b. Following this, the voltage V2 is applied to the conductive line A and the voltage V1 is applied to the conductive line B, thereby making it possible to arrange the spacers in gaps c. As a result, by spreading spacer twice, the spacers can be arranged in half the entire gaps. After the spacers are arranged, the conductive lines A and B are cut to thereby provide a stripe transparent electrode. It is noted that the comb-shaped electrode of 2:2 structure shown in FIG. 8(II) forms electric lines of force shown in FIG. 9(II).

Generally, the distance between linear transparent electrodes in a liquid crystal display is as short as several tens of microns. If a potential difference of several hundreds volts is given to the linear transparent electrodes aligned at such short distances, short-circuit may sometimes occur between the electrodes. In case of the liquid crystal display manufacturing method of the present invention, it is preferable that the distance between the linear transparent electrodes aligned with each other and applied with different voltages is set wider than that between the linear transparent electrodes aligned with each other and applied with the same voltage. This makes it possible to prevent short-circuit from occurring between the electrodes and to enhance yield.

In addition, even if the spacers protrude out onto the linear transparent electrodes in a liquid crystal display constituted such that the distance between the linear transparent electrodes aligned with each other and applied with the same voltage is formed to be shorter than that between the linear transparent electrodes aligned with each other and applied with different voltages and that the black matrix of the color filter is formed equidistantly to have a width equal to or larger than that between the linear transparent electrodes arranged with each other and applied with different voltages, i.e., formed to have a larger width than that between the electrodes onto which the spacers are arranged, it is possible to prevent light from leaking from the spacers protruding onto the linear transparent electrodes and to enhance contrast while changing the magnitudes of pixels.

Figure 10:
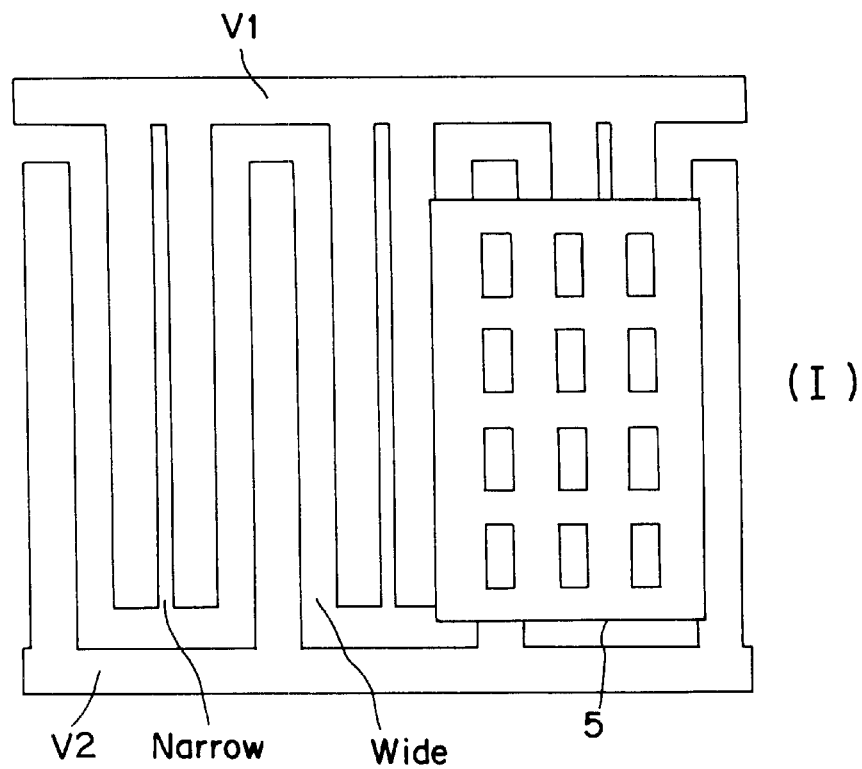
FIG. 10 is schematic view of a comb-shaped electrode used in one example of a liquid crystal display manufacturing method according to the present invention.
Figure 10:
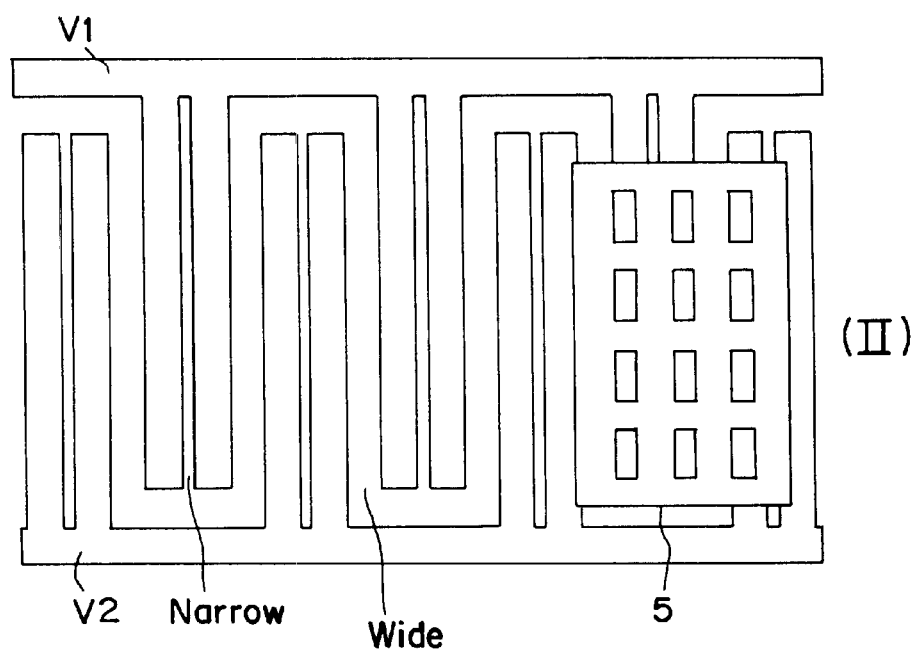

A stripe transparent electrode having the linear transparent electrodes constituted as mentioned above includes, for example, a comb-shaped electrode of 2:1 structure shown in FIG. 10(I). In the comb-shaped electrode of 2:1 structure shown therein, voltage V1 is applied to two linear transparent electrodes aligned with other at a shorter distance. Since the two linear transparent electrodes are applied with the same voltage, no short-circuit occurs between them no matter how short the distance is. On the other hand, there is fear that short-circuit may occur between the linear transparent electrode applied with the voltage V1 and that applied with the voltage V2 since potential difference is generated therebetween. However, the distance between the two electrodes is set wider, thereby preventing occurrence of short-circuit therebetween. Now, if the width of the black matrix is set wider than the distance between the electrodes as shown in FIG. 10(I), it is possible to obtain uniform display aperture sections.

In addition, even if the stripe transparent electrode is a comb-shaped electrode of 2:2 structure, it is possible to prevent occurrence of short-circuit between the linear transparent electrodes by setting the distance between two linear transparent electrodes aligned with each other and applied with different voltages wider than that between the linear transparent electrodes aligned with each other and applied with the same voltage.

The comb-shaped electrode is not limited to the above-stated structure and that of 2:3 structure, 2: n structure (where n is an integer not less than 4) or the like maybe used. Besides, one or more linear transparent electrodes may be formed in a gap of the comb-shaped electrode. It is also possible to arrange spacers in the gaps between two adjacent linear transparent electrodes of the comb-shaped electrode by applying the voltage V1 to the comb-shaped electrode.

To change the distance between two linear transparent electrodes aligned with each other, the method of, for example, changing the widths of linear transparent electrodes, that of changing only the distance between electrodes while keeping the widths of linear transparent electrodes same, that of combining these two methods or the like can be adopted.

In case of adapting the liquid crystal display manufacturing method according to this invention to the production of a TFT-type liquid crystal display, a stripe electrode is formed on a color filter-side substrate and spacers are arranged in electrode gaps using the electrode. In the TFT-type liquid crystal display, the color filter-side substrate is usually provided with a solid electrode. Even if the substrate is provided with a stripe electrode, it is possible to drive the TFT-type liquid crystal display in the same manner as that of the normal TFT-type liquid crystal display by applying the same voltage to the respective linear electrodes constituting the stripe electrode.

Description will now be given to examples of the second, third and fourth inventions with reference to FIGS. 11 to 19.

Figure 11:
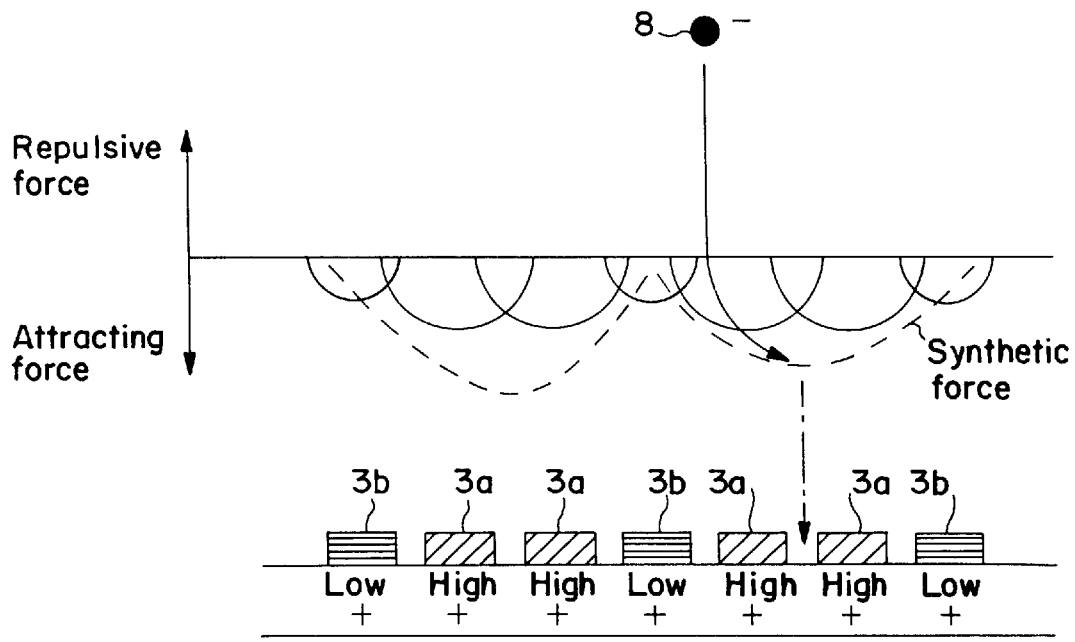
FIG. 11 is a conceptual view for describing a method of arranging spacers by means of an electric field generated on stripe transparent electrodes used in one example of a liquid crystal display manufacturing method according to the present invention.

As shown in FIG. 11, voltages having different voltage values are applied to a plurality of linear transparent electrodes aligned in parallel, thereby applying a positive voltage (+) to a plurality of linear transparent electrodes 3a and 3b and a high potential relative to that of plural linear transparent electrodes 3b is given to plural adjacent linear transparent electrodes 3a. Further, spacers 8 are charged negatively and then spread. By doing so, it is possible to arrange the spacers 8 only between the linear transparent electrodes 3a.

That is, in FIG. 11, as the spread spacers 8 drop and approach the linear transparent electrodes 3a and 3b, attracting forces of an electric field formed by electric lines of force generated above the linear transparent electrodes 3a and 3b act on the spacers 8. The spacers 8 are separated from the linear transparent electrodes 3b generating weak attracting forces and moved toward the linear transparent electrodes 3a generating strong attracting forces. Thereafter, the spacers 8 moved toward the linear transparent electrodes 3a are attracted by equal attracting forces from the respective linear transparent electrodes 3a and drop between the linear transparent electrodes 3a.

It is noted a semi-circle shown in FIG. schematically shows an attracting force acting on the spacers 8 and the magnitude of the attracting force acting on the spacers 8 is indicated by that of the semi-circle protruding downward. A broken line schematically shows a synthetic force of attracting forces acting on the spacers 8.

Figure 12:
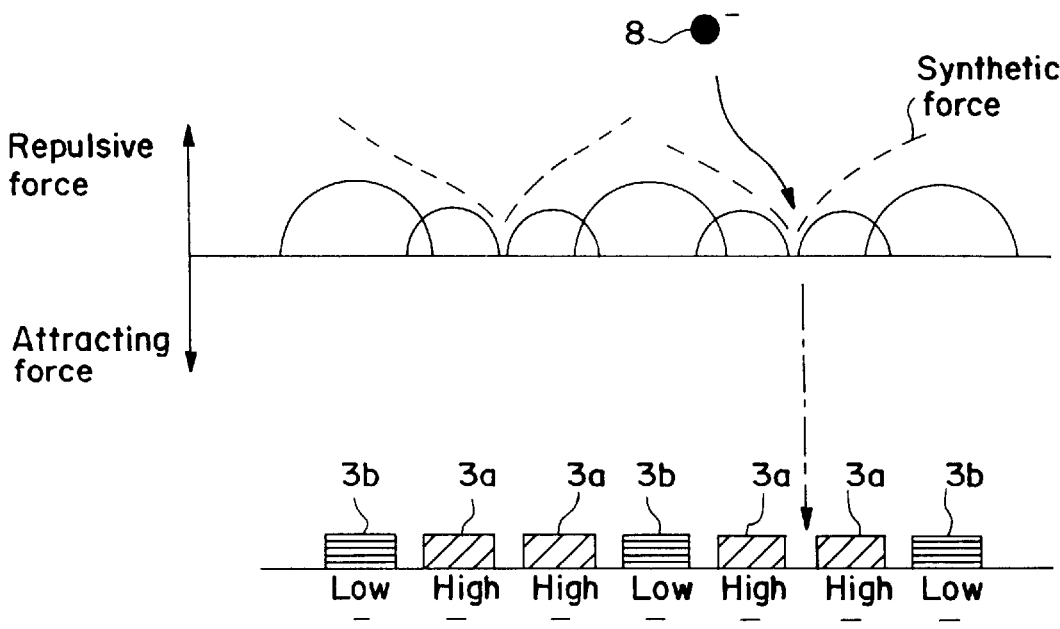
FIG. 12 is a conceptual view for describing a method of arranging spacers by means of an electric field generated on stripe transparent electrodes used in one example of a liquid crystal display manufacturing method according to the present invention.

As shown in FIG. 12, voltages having different voltage values are applied to a plurality of linear transparent electrodes aligned with each other, thereby applying a negative (−) voltage to the linear transparent electrodes 3a and 3b and giving a high potential relative to that of the linear transparent electrodes 3b, to the linear transparent electrodes 3a. In addition, spacers 8 are negatively charged and then spread. By doing so, it is possible to arrange the spacers 8 only between the linear transparent electrodes 3a.

That is, in FIG. 12, as the spread spacers 8 drop and approach the linear transparent electrodes 3a and 3b, repulsive forces of an electric field formed by electric lines of force generated above the linear transparent electrodes 3a and 3b act on the spacers 8. The spacers 8 are separated from the linear transparent electrodes 3b generating strong repulsive forces and moved toward the linear transparent electrodes 3a generating weak repulsive forces. Thereafter, the spacers 8 moved toward the linear transparent electrodes 3a are pushed by equal repulsive forces from the respective linear transparent electrodes 3a and drop between the linear transparent electrodes 3a.

It is noted a semi-circle shown in FIG. schematically shows a repulsive force acting on the spacers 8 and the magnitude of the repulsive force acting on the spacers 8 is indicated by the magnitude of the semi-circle protruding upward. A broken line schematically shows a synthetic force of repulsive forces acting on the spacers 8.

According to this example, since the spacers 8 are pushed by the equal repulsive forces from the respective linear transparent electrodes 3a and drop between the linear transparent electrodes 3a, the spacers 8 can be arranged at the central portions between the linear transparent electrodes 3a in a concentrated manner and the probability that the spacers 8 are arranged onto the edge portions of the linear transparent electrodes 3a can be decreased.

Figure 13:
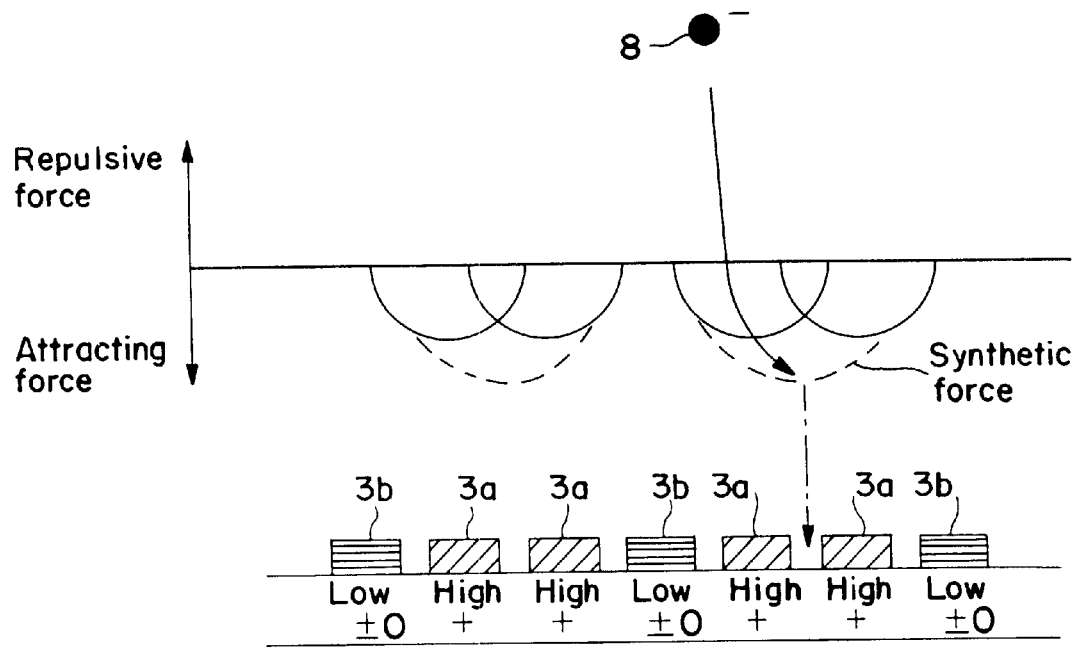
FIG. 13 is a conceptual view for describing a method of arranging spacers by means of an electric field generated on stripe transparent electrodes used in one example of a liquid crystal display manufacturing method according to the present invention.

As shown in FIG. 13, by applying voltages having different voltage values to a plurality of linear transparent electrodes aligned in parallel, the linear transparent electrodes 3a are applied with a positive (+) voltage and the linear transparent electrodes 3*b* are given an earth potential (0). Further, the spacers 8 are negatively charged and then spread. By doing so, the spacers 8 can be arranged only between the linear transparent electrodes 3*a*.

That is, in FIG. 13, as the spread spacers 8 drop and approach the linear transparent electrodes 3*a* and 3*b*, attracting forces of an electric field formed by electric lines of force generated above the linear transparent electrodes 3*a* act on the spacers 8. The spacers 8 are moved toward the linear transparent electrodes 3*a* generating attracting forces. Thereafter, the spacers 8 moved toward the linear transparent electrodes 3*a* are attracted by equal attracting forces from the respective linear transparent electrodes 3*a* and drop between the linear transparent electrodes 3*a*.

Figure 14:
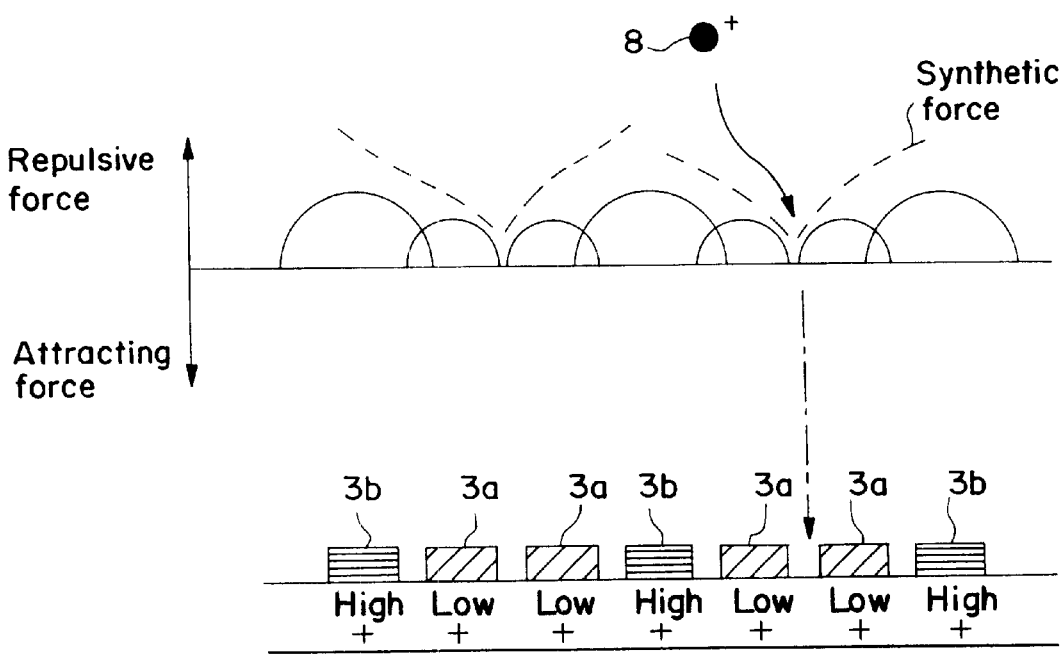
FIG. 14 is a conceptual view for describing a method of arranging spacers by means of an electric field generated on stripe transparent electrodes used in one example of a liquid crystal display manufacturing method according to the present invention.

As show in FIG. 14, by applying voltages having different voltage values to a plurality of linear transparent electrodes aligned in parallel, the linear transparent electrodes 3*a* and 3*b* are applied with a positive (+) voltage and the linear transparent electrodes 3*a* are given a low potential relative to that of the linear transparent electrodes 3*b*. Further, the spacers 8 are positively charged and then spread. By doing so, as in the case of FIG. 12, the spacers 8 can be arranged only between the linear transparent electrodes 3*a*.

According to this example, since the spacers 8 are pushed by the equal repulsive force from the respective linear transparent electrodes 3*a* and drop between the linear transparent electrodes 3*a*, the spacers 8 can be arranged at the central portions of the linear transparent electrodes 3*a* in a concentrated manner and the probability that the spacers 8 may be arranged on the edge portions of the linear transparent electrodes 3*a* can be decreased.

Figure 15:
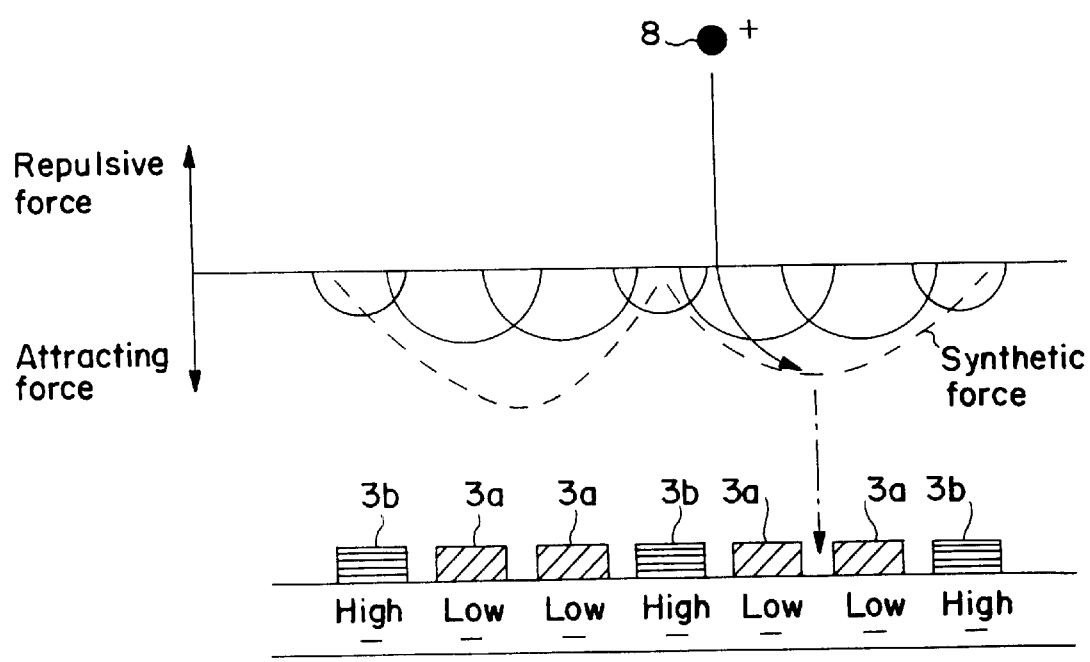
FIG. 15 is a conceptual view for describing a method of arranging spacers by means of an electric field generated on stripe transparent electrodes used in one example of a liquid crystal display manufacturing method according to the present invention.

As shown in FIG. 15, by applying voltages having different voltage values to a plurality of linear transparent electrodes aligned in parallel, the linear transparent electrodes 3*a* and 3*b* are applied with a negative (−) voltage and the linear transparent electrodes 3*a* are given a high potential relative to that of the linear transparent electrodes 3*b*. Further, the spacers 8 are positively charged and then spread. By doing so, as in the case of FIG. 11, the spacers 8 can be arranged only between the linear transparent electrodes 3*a*.

Figure 16:
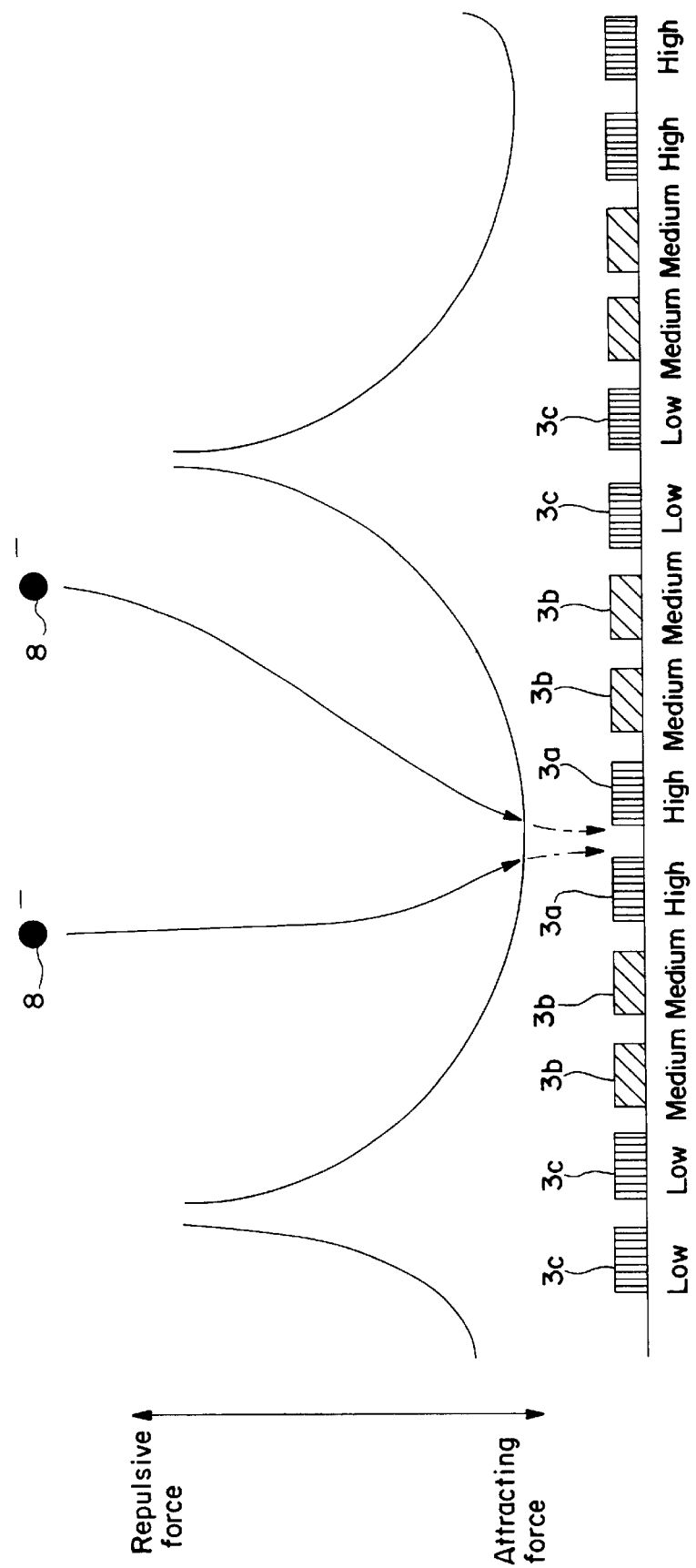
FIG. 16 is a conceptual view for describing a method of arranging spacers by means of an electric field generated on stripe transparent electrodes used in one example of a liquid crystal display manufacturing method according to the present invention.

As shown in FIG. 16, by applying voltages having different voltage values to a plurality of linear transparent electrodes aligned in parallel, the linear transparent electrodes 3*a* are given a high potential relative to that of the linear transparent electrodes 3*b* and the linear transparent electrodes 3*c* are given a low potential relative to that of the linear transparent electrodes 3*b*. Further, the spacers 8 are negatively charged and then spread. By doing so, the spacers 8 can be arranged only between the linear transparent electrodes 3*a*.

That is, in FIG. 16, as the spread spacers 8 drop and approach the linear transparent electrodes 3*a*, 3*b* and 3*c*, repulsive forces or attracting forces of an electric field formed by electric lines of force generated above the linear transparent electrodes 3*a*, 3*b* and 3*c*, or repulsive forces or attracting forces by said electric field, act on the spacers 8. The spacers 8 are moved toward the linear transparent electrodes 3*a* having the highest potential. Thereafter, the spacers 8 moved toward the linear transparent electrodes 3*a* pushed by equal repulsive forces or attracted by equal attracting forces from the respective linear transparent electrodes and drop between the linear transparent electrodes 3*a*.

Figure 17:
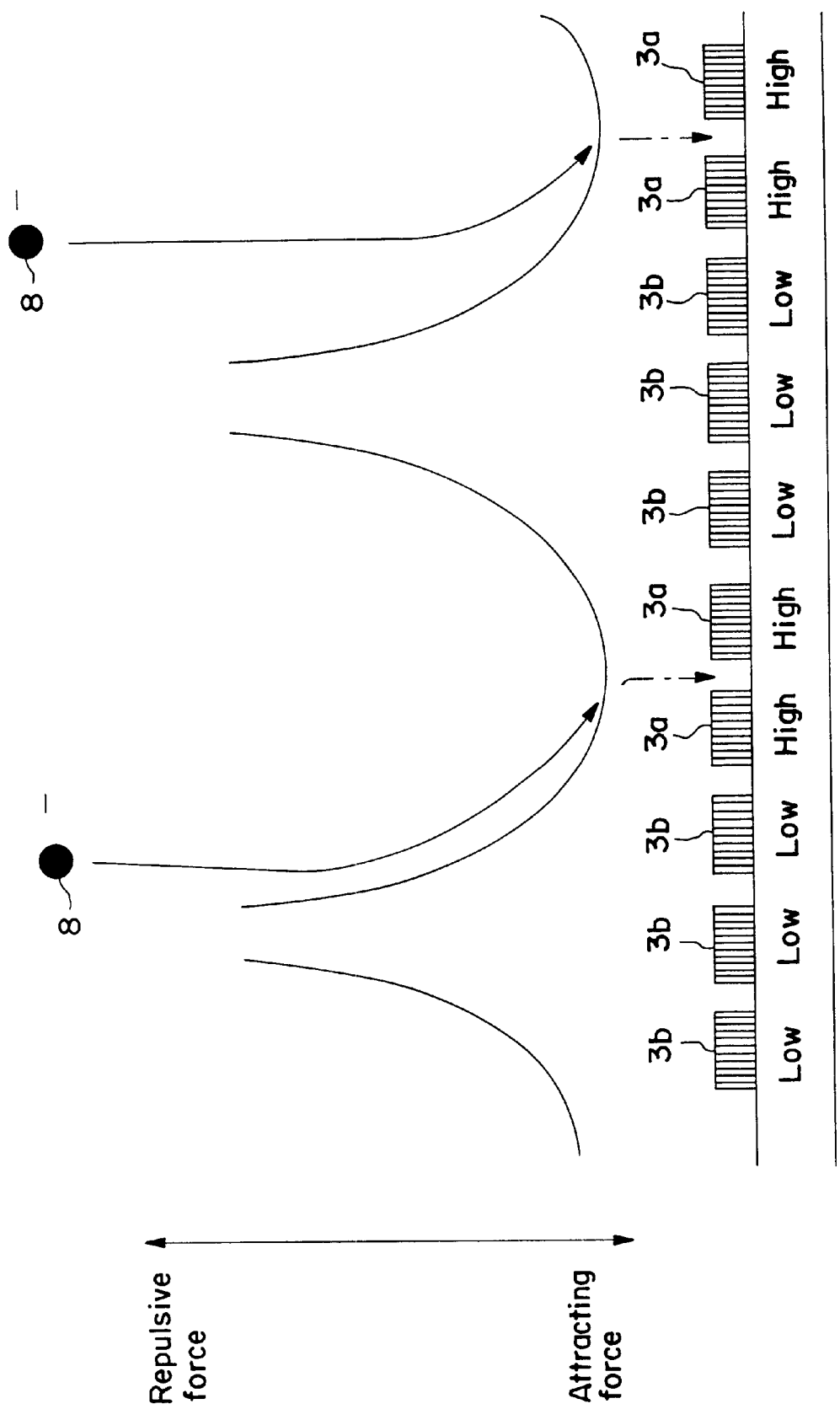
FIG. 17 is a conceptual view for describing a method of arranging spacers by means of an electric field generated on stripe transparent electrodes used in one example of a liquid crystal display manufacturing method according to the present invention.

As shown in FIG. 17, by applying voltages having different voltage values to a plurality of linear transparent electrodes aligned in parallel, the linear transparent electrodes 3*a* are given a high potential relative to that of the linear transparent electrodes 3*b*. Further, the spacers 8 are negatively charged and then spread. By doing so, the spacers 8 can be arranged only between the linear transparent electrodes 3*a*.

That is, in FIG. 17, as the spread spacers 8 drop and approach the linear transparent electrodes 3*a* and 3*b*, repulsive forces or attracting forces of an electric field formed by electric lines of force generated above the linear transparent electrodes 3*a* and 3*b*, or repulsive forces or attracting forces by electric field, act on the spacers 8. The spacers 8 are moved toward the linear transparent electrodes 3*a* having the highest potential. Thereafter, the spacers 8 moved toward the linear transparent electrodes 3*a* are pushed by the equal repulsive forces or attracted by equal attracting forces from the respective linear transparent electrodes 3*a* and drop between the linear transparent electrodes 3*a*.

Figure 18:
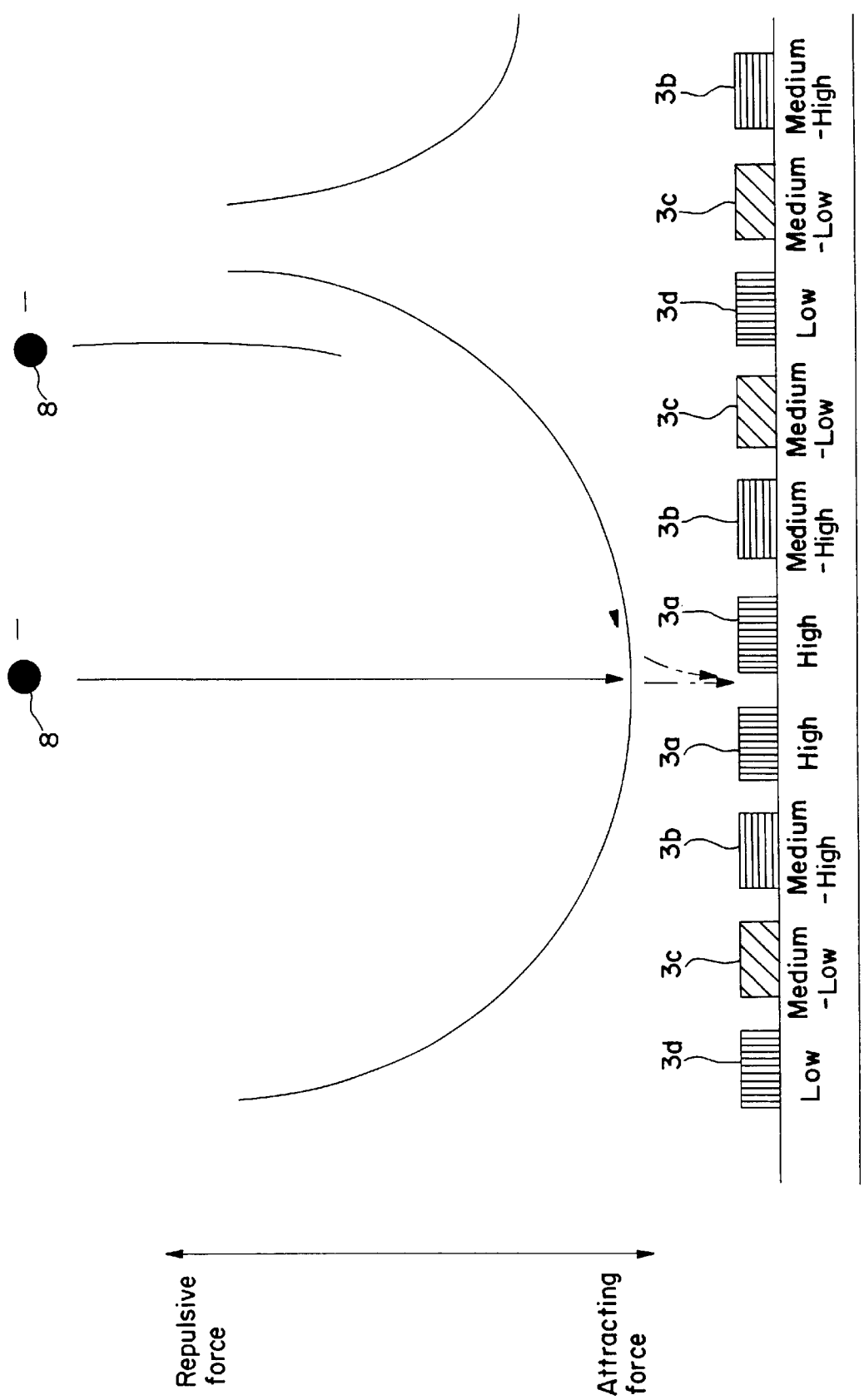
FIG. 18 is a conceptual view for describing a method of arranging spacers by means of an electric field generated on stripe transparent electrodes used in one example of a liquid crystal display manufacturing method according to the present invention.

As shown in FIG. 18, by applying voltages having different voltage values to a plurality of linear transparent electrodes aligned in parallel, the linear transparent electrodes 3*a* are given a high potential relative to that of the linear transparent electrodes 3*b*, the linear transparent electrodes 3*b* are given a high potential relative to that of the linear transparent electrodes 3*c* and the linear transparent electrodes 3*c* are given a high potential relative to that of the linear transparent electrodes 3*d*. Further, the spacers 8 are negatively charged and then spread. By doing so, the spacers 8 can be arranged only between the linear transparent electrodes 3*a*.

That is, in FIG. 18, as the spread spacers 8 drop and approach the linear transparent electrodes 3*a*, 3*b*, 3*c* and 3*d*, repulsive forces or attracting forces of an electric field formed by electric lines of force generated above the linear transparent electrodes 3*a*, 3*b*, 3*c* and 3*d*, or repulsive forces or attracting forces by electric field, act on the spacers 8. The spacers 8 are moved toward the linear transparent electrodes 3*a* having the highest potential. Thereafter, the spacers 8 moved toward the linear transparent electrodes 3*a* are pushed by equal repulsive forces or attracted by equal attracting forces from the respective linear transparent electrodes 3*a* and drop between the linear transparent electrodes 3*a*.

While the examples of this invention have been described above, this invention is not limited to these examples. Even if the spacers 8 are negatively charged shown in FIG. 19, the present invention can obtain the same advantage in accordance with the relative potential difference in the present invention.

Figure 19:
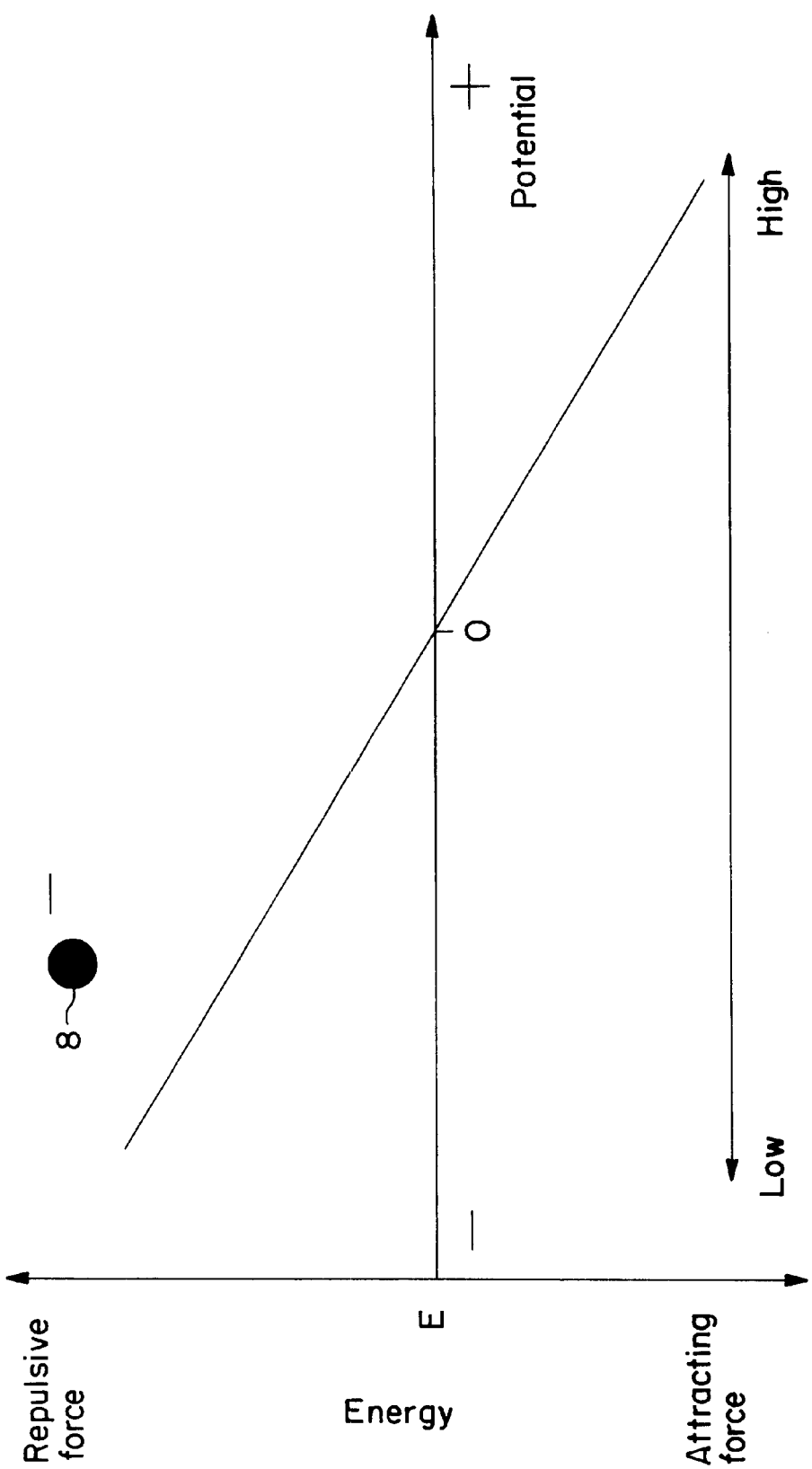
FIG. 19 is a conceptual view for describing the relationship between the relative difference in potentials giving to a plurality of linear transparent electrodes and the magnitude of a repulsive force or attracting force effected on the spacers by the potentials.
Figure 20:
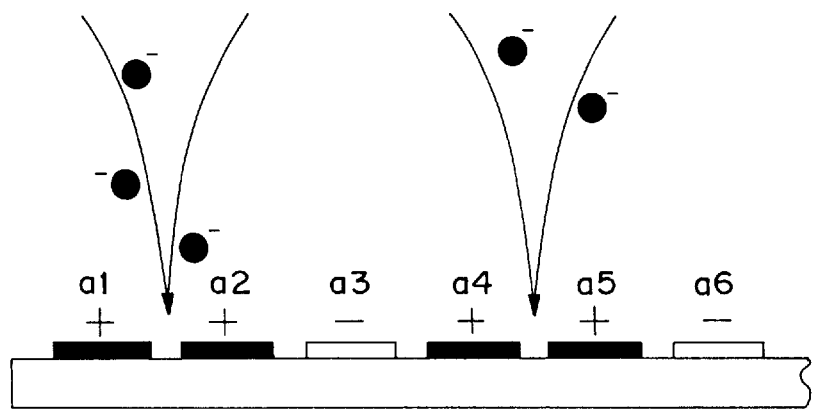
FIG. 20 is a conceptual view for describing one example of a liquid crystal display manufacturing method according to the present invention.

FIG. 19 shows a case where spacers 8 are negatively charged and also shows a conceptual view for describing he relationship between the difference in relative potential given to a plurality of linear transparent electrodes and the magnitude of a repulsive force or an attracting force given by the potential to the spacers 8.

If an earth potential with which no repulsive forces or attracting forces act on the spacers 8 is 0V as a reference potential, the difference in relative potential and the polarities of the potentials are indicated by symbols + and −. Namely, in FIG. 19, +300 is a low potential relative to +500V and −300V is a high potential relative to −500V.

Repulsive forces or attracting forces of an electric field formed by electric lines of force generated above the plural linear transparent electrodes act between a plurality of linear transparent electrodes and the spacers 8 at certain distance by the polarities of the potentials given to the plural linear transparent electrodes. In FIG. 19, the polarity of a spacer 8 is negative and a repulsive force is generated at a −(negative) potential and an attracting force is generated at a +(positive) potential. In addition, those repulsive forces and attracting forces show that the repulsive force is stronger as the potential of the spacer 8 is closer to −(negative) potential side and the attracting force is stronger as the potential of the spacer 8 is closer to the +(positive) potential side. That is, the attracting force is stronger at +500V than +300V and the repulsive force is stronger at −500V than −300V.

If the spacer 8 is positively charged, the attracting force and the repulsive force are only reversed, that is, an attracting force is generated at a −(negative) potential and a repulsive force is generated at a +(positive) potential. In addition, those repulsive forces and attracting forces show that the attracting force is stronger as the potential is closer to the −potential side and that the repulsive force is stronger as the potential is closer to the +potential side. That is, the repulsive force is stronger at +500V than +300V and the attracting force at −500V than −300V.

The relative difference in potential according to the present invention is defined as follows. A potential positioned at a −(negative) potential side is defined as a low potential and that positioned at a +(positive) potential side is defined as a high potential irrespectively of the magnitude of the force acting on the spacer 8 as shown in FIG. 19. That is, it is defined that +500V has a high potential relative to that of +300V and that −500V has a low potential relative to that of −300V.

This definition also applies to a case where the spacer 8 is positively charged. Therefore, it is defined.that +500V has a low potential relative to that of +300 and −500V has a low potential relative to that of −300V.

Since the liquid crystal display manufacturing methods according to the second, third and fourth inventions are constituted as mentioned above, spacers can be arranged onto the black matrix portion while removing the spacers onto the pixel electrodes. Hence, it is possible to manufacture a liquid crystal display having extremely high contrast without light leakage resulting from the spacers.

The fifth invention is a method of manufacturing a liquid crystal display wherein spacers are spread onto a first substrate having a stripe transparent electrode constituted by aligning a plurality of linear transparent electrodes in parallel, a second substrate is arranged above the first substrate to oppose the first substrate and a liquid crystal are injected into a gap between the substrates, spreading said spacers is curried out by applying a voltage of a reversed polarity to a polarity of charge of the spacers and a voltage of the same polarity as the polarity of charge of the spacers to a plurality of linear transparent electrodes aligned in parallel; and a method of applying voltages of reverse and same polarities comprises applying a voltage of the reversed polarity to two linear transparent electrodes, respectively, applying a voltage of the same polarity to one linear transparent electrode and applying voltages so that the arrangement of these adjacent three linear transparent electrode becomes a unit to be repeated, thereby spreading the spacers in the gap between the adjacent two linear transparent electrodes applied with the reversed polarity.

The liquid crystal display, spacers, substrate, constituent stripe transparent electrode according to the fifth invention may be, for example, the same as those described in the first, second, third and fourth inventions.

According to the fifth invention, the voltage V1 described in the third and fourth inventions is set as a voltage having a reversed polarity to that of the charged spacers and the voltage V2 is set as a voltage having the same polarity as that of the charged spacers.

If the spacers are formed of, for example, synthetic resin, the spacers are charged while repeatedly contacted (collided) with piping walls. If the transparent electrodes are applied with a negative voltage having the same polarity so as to negatively charge the spacers, the spacers are repulsed by repulsive forces and spread to portions other than the transparent electrodes. If a positive voltage having the reversed polarity is applied, the spacers are spread onto the transparent electrodes in a concentrated manner by attracting forces.

According to the fifth invention, in the stripe transparent electrode constituted by aligning a plurality of linear transparent electrodes in parallel, positive or negative voltages are individually applied to the plural linear transparent electrodes (which are temporarily referred to as "a1, a2, a3, a4, a5, a6, . . . " respectively).

If a negative voltage and a positive voltage are alternately spread to the plural linear transparent electrodes, spacers are spread to the centers of the widths of the transparent electrodes applied with the positive voltage by the duplicate functions of the repulsive forces and the attraction forces.

Based on the above, if a positive voltage (+) is applied to two electrodes and a negative voltage (−) applied to one electrode repeatedly, like a1 is applied with a positive voltage, a2 with a positive voltage, a3 with a negative voltage, a4 with a positive voltage, a5 with a positive voltage, a6 with a negative voltage . . . , then one electric field is formed between al and a2, between a4 and a5, . . . , (one reason of which is the distance between the transparent electrodes is as short as about 10 to 30 μm), the spacers are repulsed by a repulsive force from the negative voltage and also attracted by an attracting force from the positive voltage to be thereby spread quite accurately at the central portions between the electrodes applied with a positive electrode. The central portion between the electrodes applied with a positive voltage means the gap between the two adjacent linear transparent electrodes applied with a voltage having a reversed polarity to the polarity of charging of spacers, i.e., a portion other than pixel electrodes, in which the main concept of the third invention lies.

The above-stated operation allows accurately spreading the spacers between a1 and a2, between a4 ad a5, . . . , at the same time, naturally making the quantity of spacers to be spread between a1 and a2, a4 and a5, . . . equal.

While the above-stated operation allows the spacers to be accurately and uniformly spread between a1 and a2, a4 and a5, . . . , the spacers cannot be spread to other gaps, i.e., between a2 and a3, a3 and a4, a5 and a6, . . . .

Owing to this, according to the third invention, it is preferable that the application of a voltage having a reversed polarity and the application of a voltage having the same polarity are repeatedly conducted so that the gaps between the two linear transparent electrodes to which the spacers are spread may exist uniformly among a plurality of linear transparent electrodes.

Figure 21:
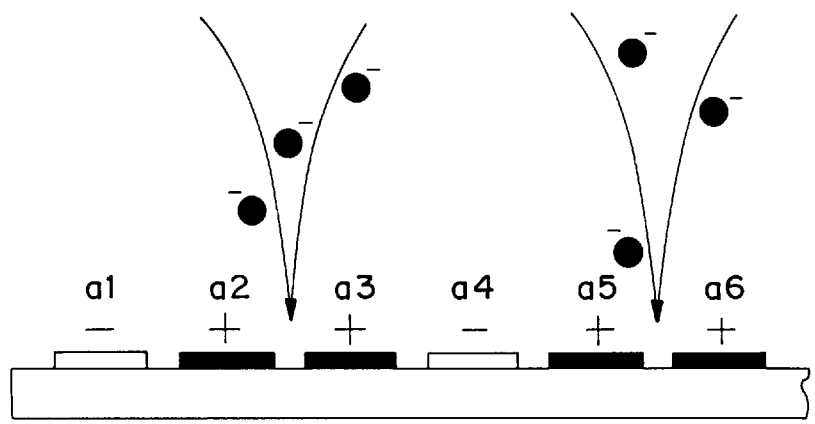
FIG. 21 is a conceptual view for describing one example of a liquid crystal display manufacturing method according to the present invention.

That is to say, after the above-stated operation, it is preferable that the combination of the positive voltage and the negative voltage applied to electrodes is changed and then spacers are spread. To be specific, as shown in FIG. 21, after the above-stated operation, a positive voltage (+) is applied to two electrodes and a negative voltage (−) is applied to one electrode repeatedly, like a1 is applied with a negative voltage, a2 with a positive voltage, a3 with a positive voltage, a4 with a negative voltage, a5 with a positive voltage, a6 with a positive voltage . . . . This allows accurately the spacers to be spread between a2 and a3, a5 and a6, . . . .

Figure 22:
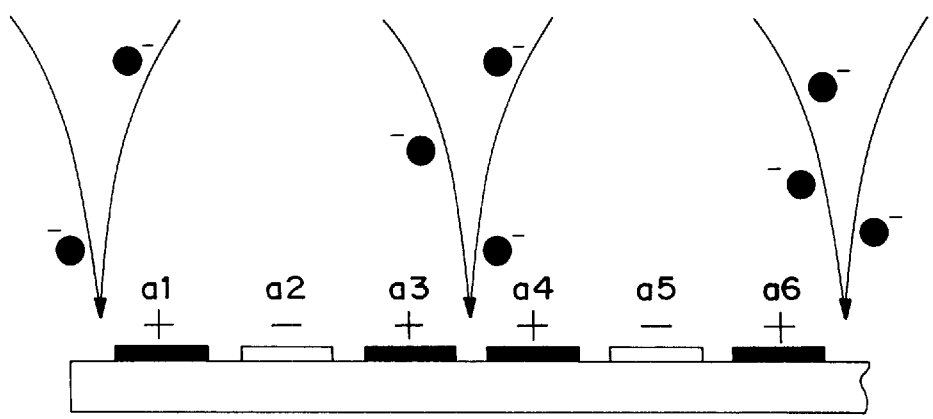
FIG. 22 is a conceptual view for describing one example of a liquid crystal display manufacturing method according to the present invention.

Further, it is more preferable that after the spacers are spread by changing the combination of positive and negative voltages to be applied to the electrodes, the combination of positive and negative voltages to be applied to the electrodes is changed again and the spacers are further applied to the electrodes. To be specific, after the above-stated operation, as shown in FIG. 22, a positive (+) voltage is applied to two electrodes and a negative (−) voltage is applied to one electrode repeatedly, like a1 is applied with a positive voltage, a2 with a negative voltage, a3 with a positive voltage, a4 with a positive voltage, a5 with a negative voltage, a6 with a positive voltage. This allows the spacers to be accurately applied between a3 and a4, . . . .

By repeatedly conducting the above-stated operation twice or third time, the spacers can be arranged in the gaps between the electrodes quite accurately and uniformly.

In other words, this spacer application methods so as to apply voltages of opposite and same polarities include:
(1) a method of repeatedly applying a voltage of a reversed polarity, that of a reversed polarity and that of the same polarity in this order;
(2) a method of repeatedly applying a voltage of a reversed polarity, that of the same polarity and that of a reversed polarity in this order; and
(3) a method of repeatedly applying a voltage of the same polarity, that of a reversed polarity and that of a reversed polarity in this order.

The object of the present invention can be attained no matter which method is used. Further, if at least two out of the three methods are conducted in a duplicate manner, it is possible to exhibit more excellent advantage.

Now, the concrete examples of the fifth invention will be described with reference to FIGS. 23 to 26.

Figure 23:
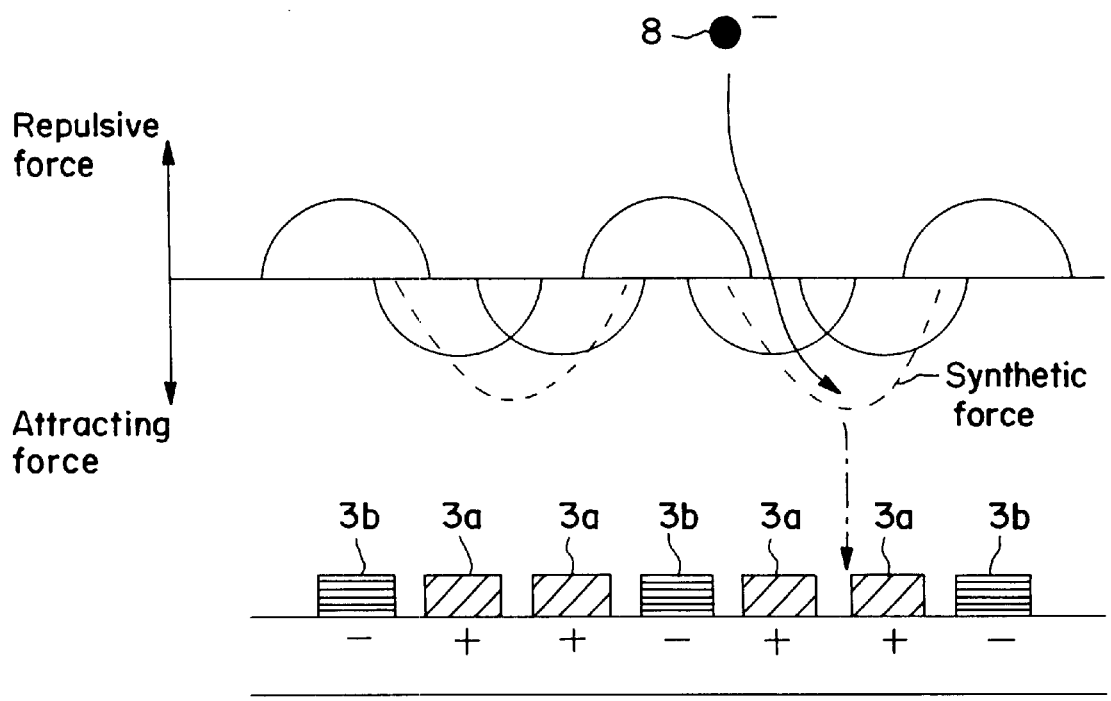
FIG. 23 is a conceptual view for describing a method of arranging spacers by means of an electric field generated on stripe transparent electrodes used in one example of a liquid crystal display manufacturing method according to the present invention.

As shown in FIG. 23, voltages having different voltage values are applied to a plurality of linear transparent electrode aligned in parallel, thereby applying a positive (+) voltage to a plurality of adjacent linear transparent electrodes 3a and a negative (−) voltage to a plurality of linear transparent electrodes 3b. Further, the spacers 8 are charged negatively and then spread. By doing so, it is possible to arrange the spacers only between a plurality of adjacent linear transparent electrodes 3a.

That is, in FIG. 23, as the spread spacers 8 drop and approach the linear transparent electrodes 3a and 3b, repulsive forces and attracting forces of an electric field formed by electric lines of force generated above the linear transparent electrodes 3a and 3b act on the spacers 8, the spacers 8 are separated from the linear transparent electrodes 3b generating repulsive forces and moved toward the linear transparent electrodes 3a generating attraction forces. Thereafter, the spacers 8 moved toward the linear transparent electrodes 3a are attracted by equal attracting forces from the respective linear transparent electrodes 3a and drop between the linear transparent electrodes 3a.

Figure 24:
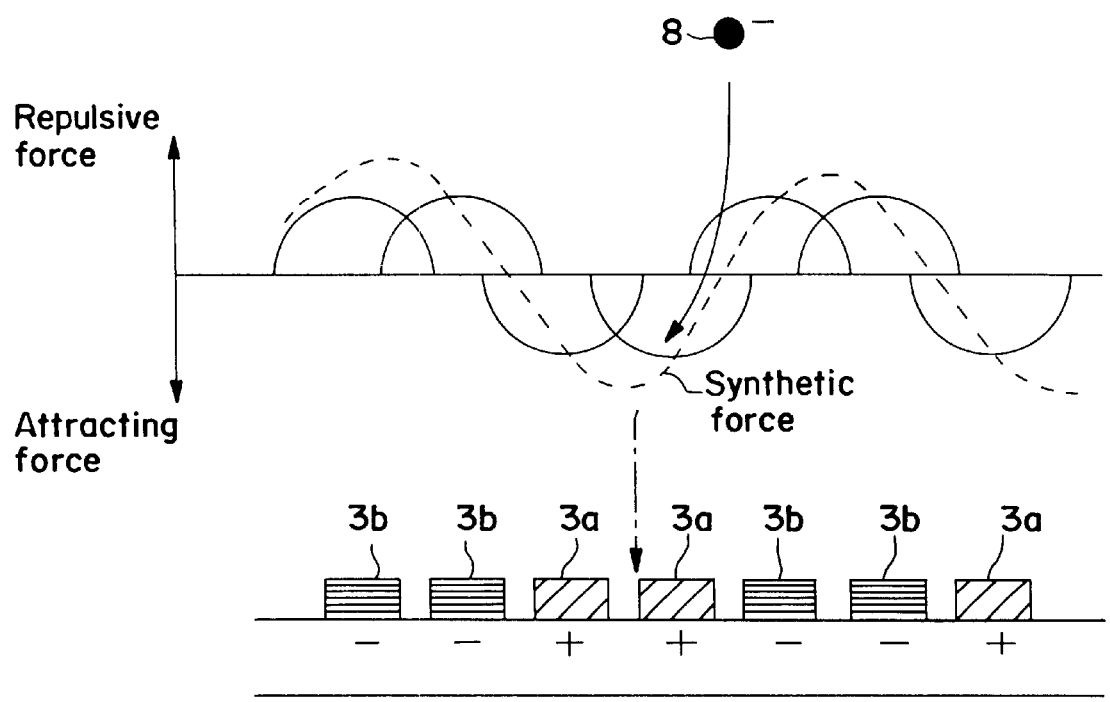
FIG. 24 is a conceptual view for describing a method of arranging spacers by means of an electric field generated on stripe transparent electrodes used in one example of a liquid crystal display manufacturing method according to the present invention.

As shown in FIG. 24, voltages having different voltage values are applied to a plurality of linear transparent electrodes aligned in parallel, thereby applying a positive (+) voltage to the linear transparent electrodes 3a and a negative (−) voltage to the linear transparent electrodes 3b. Further, the spacers 8 are negatively charged and then spread. By doing so, as in the case of FIG. 23, it is possible to arrange the spacers 8 only between the linear transparent electrodes 3a.

Figure 25:
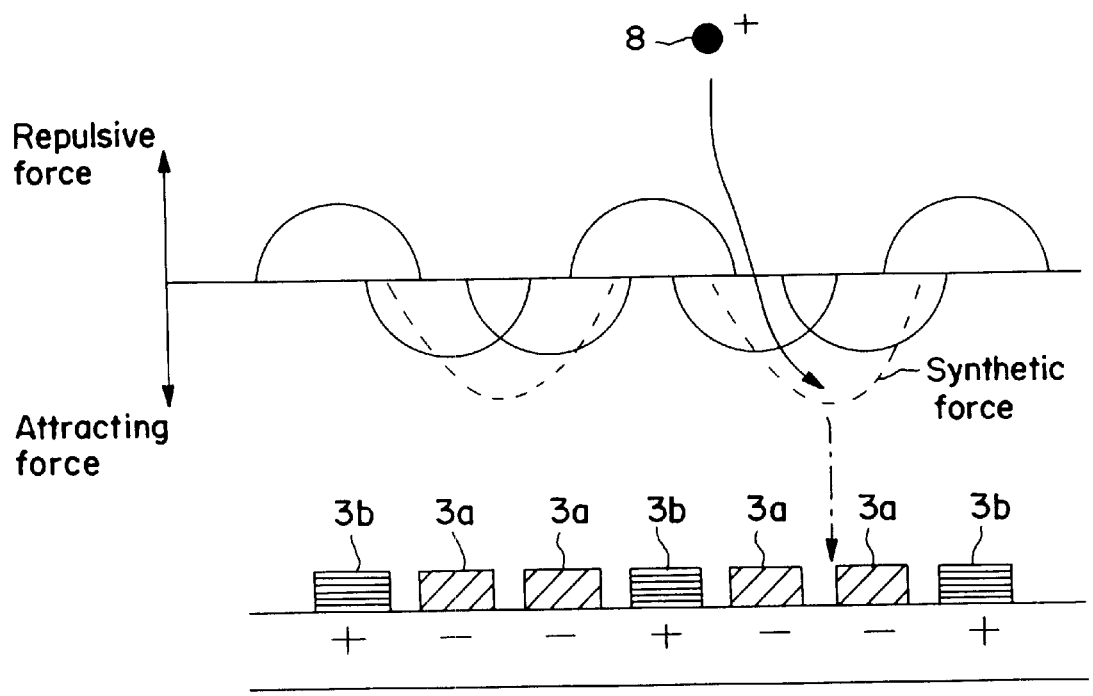
FIG. 25 is a conceptual view for describing a method of arranging spacers by means of an electric field generated on stripe transparent electrodes used in one example of a liquid crystal display manufacturing method according to the present invention.

As shown in FIG. 25, voltages having different voltage values are applied to a plurality of linear transparent electrodes aligned in parallel, thereby applying a negative (−) voltage to the linear transparent electrodes 3a and a positive (+) voltage to the linear transparent electrodes 3b. Further, the spacers 8 are positively charged and then spread. By doing so, as in the case of FIG. 23, it is possible to arrange the spacers 8 only between the linear transparent electrodes 3a.

Figure 26:
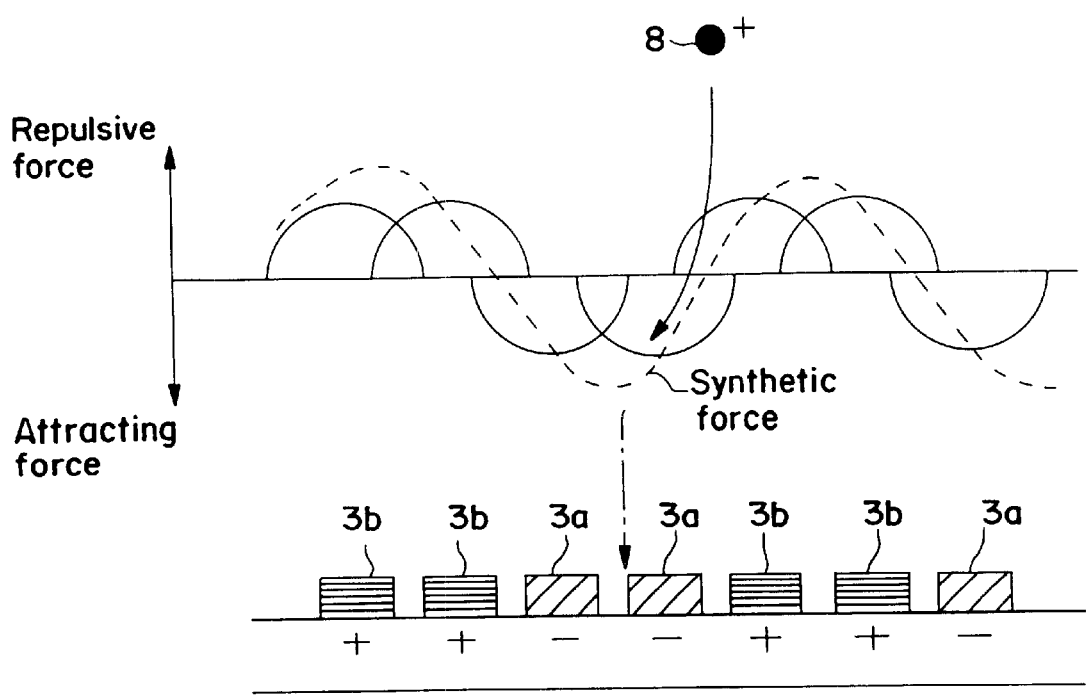
FIG. 26 is a conceptual view for describing a method of arranging spacers by means of an electric field generated on stripe transparent electrodes used in one example of a liquid crystal display manufacturing method according to the present invention.
Figure 27:
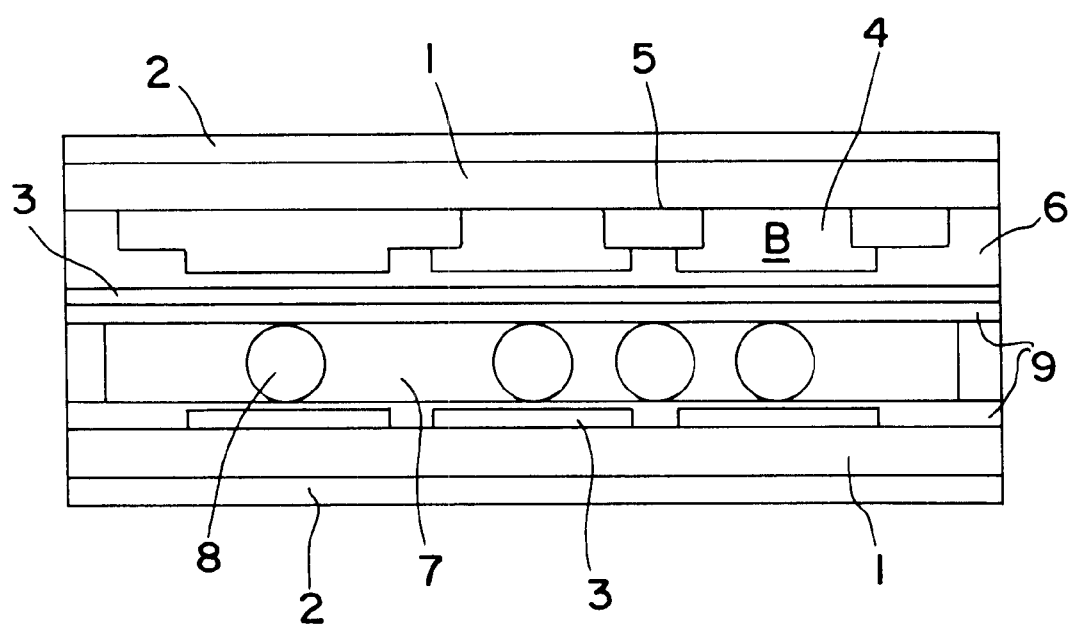
FIG. 27 is a conceptual cross-sectional view of a conventional liquid crystal display.

As shown in FIG. 26, voltages having different voltage values are applied to a plurality of linear transparent electrodes aligned in parallel, thereby applying a negative (−) voltage to the linear transparent electrodes 3a and a positive (+) voltage to the linear transparent electrodes 3b. Further, the spacers 8 are positively charged and then spread. By doing so, as in the case of FIG. 23, it is possible to arrange the spacers 8 only between the linear transparent electrodes 3a.

Since the liquid crystal display manufacturing method according to the fifth invention is constituted as mentioned above, it is possible to arrange onto the black matrix portion while removing the spacers onto the pixel electrodes. Hence, it is possible to manufacture a liquid crystal display having extremely high contrast without light leakage resulting from the spacers.

BEST MODE FOR CARRYING OUT THE INVENTION

Next, the present invention will be described in more detail by using the following examples. It is noted, however, that the present invention should not be limited to the examples.

EXAMPLE 1

First, as shown in FIG. 8(I), in a common electrode for an STN-type liquid crystal display (color filter formation substrate of an aperture of each RGB pixel of 80 $\mu$m×285 $\mu$m, a line width of a black matrix of 20 $\mu$m, an ITO electrode width of 290 $\mu$m, an electrode distance of 15 $\mu$m and a substrate thickness of 0.7 mm), a substrate was made so as to form stripe electrodes (ITO electrodes) into a comb-shaped electrode of 2:1 structure and make them continuous out of the range of the liquid display.

An alignment film of polyimide having a thickness of 0.05 $\mu$m was formed on the resultant substrate and a rubbing treatment was carried out.

Next, as shown in FIG. 3, the substrate was disposed within a container main body of an applicator and a voltage applying device was connected to conductive sections of the substrate so as to apply DC voltages separately. A spacer supply tube was provided at the upper portion of the applicator and an appropriate quantity of spacers are injected into the tube and the spacers were discharged by compressed air to thereby spread the spacers onto the substrate.

As a spacer, MICROPEARL®BB (grain size of 5.1 $\mu$m; Sekisui Fine Chemical K.K.) was used.

A voltage of +700V was applied to the conductive section 13a at the two-electrode side of the 2:1 comb-shaped electrode and a voltage of +500V was applied to the conductive section 13b at the one-electrode side thereof. While maintaining a state in which a potential difference of 200V was given, an appropriate quantity of spacers were discharged from the spacer supply tube and spread onto the substrate.

The spacer arrangement state after spreading the spacers was observed. Then, it was found that most of the spacers were arranged linearly on the portions between the ITO electrodes of the two-electrode side 2:1 comb-shaped electrode (arranged one-third portions between the stripe electrodes). The spacers arranged under the black matrixes amounted to about 90% of the total spacers. Also, the distance between the lines of the spacers arranged linearly was about 900 μm. The number of spacers per mm² of a liquid crystal display surface was about 200 on average.

The conductive sections of the substrate obtained as mentioned above were cut off and the resultant substrate was laminated, as a normal common electrode, with a segment electrode substrate (segment electrode: stripe electrode having an ITO electrode line width of 80 μm and the distance between ITO electrodes of 15 μm) and assembled into a liquid crystal display by a known method. As a result, an image of high display quality having very good contrast was obtained.

COMPARATIVE EXAMPLE 1

The comb-shaped electrode in Example 1 was formed to have a structure of 16:1. A voltage of +700V was applied to a conductive section at 16-electrode-side of the 16:1 comb-shaped electrode and a voltage of +500V was applied to a one-electrode-side conductive section. Thereafter, spacers were spread in the same manner as Example 1.

The spacer arrangement state after spreading the spacers was observed. Then, it was found that the spacers were arranged linearly at the center of 16 lines (center of 8/8). The widths of the lines of the spacers arranged linearly exceeded 5 mm. The number of spacers per mm² of a liquid crystal display surface was about 200 on average.

When the conductive sections of the resultant substrate obtained as mentioned above were cut off and the substrate was assembled into a liquid crystal display by a known method, gaps between the portions on which the spacers were arranged and those on which the spacers were not arranged changed and waved, resulting in display deficiency.

COMPARATIVE EXAMPLE 2

In the comb-shaped electrode in Example 1, a voltage of +550V was applied to a conductive section at two-electrode-side of the 2:1 comb-shaped electrode and +500V was applied to a one-electrode-side conductive section. While maintaining a state in which a potential difference of 50V was generated, spacers were spread in the same manner as Example 1.

A spacer arrangement state after spreading the spacers was observed. Then, it was found that the spacers were arranged to extend between two ITO electrodes of the two-electrode-side 2:1 comb-shaped electrode. The spacers arranged under the black matrix amounted to about 45% of the total spacers. Also, the distance between the lines of the spacers arranged linearly was 900 μm. The number of spacers per mm² of a display surface was about 200 on average.

The conductive sections of the substrate obtained as mentioned above were cut off and the substrate was assembled as general common electrode substrate into a liquid crystal display by a known method. Then, the display quality of the device was not so different from that of a conventional liquid crystal display having spacers arranged at random.

COMPARATIVE EXAMPLE 3

The number of spacers to be spread was reduced to about one-tenth of that in Example 1 and the spacers were spread in the same manner as Example 1.

A spacer arrangement state after spreading the spacers was observed. Then, it was found that most of the spacers were arranged linearly on the portions between the ITO electrodes of the two-electrode-side 2:1 comb-shaped electrode. The spacers arranged under the black matrix amounted to about 90% of the total spacers. The distance between the lines of the spacers arranged linearly was 900 μm. The number of spacers per mm² of a display surface was less than about 20 on average.

The conductive sections of the substrate obtained as mentioned above were cut off and the resultant substrate was assembled, as a general common electrode substrate, into a liquid crystal display by a known method. However, gaps could not be maintained and the liquid crystal display could not be assembled.

COMPARATIVE EXAMPLE 4

The number of spacers to be spread used in Example 1 was increased fourfold and the spacers were spread in the same manner as Example 1.

A spacer arrangement state after spreading the spacers was observed. Then, it was found that many spacers were arranged linearly to extend between the ITO electrodes of the two-electrode-side 2:1 comb-shaped electrode. The spacers arranged under the black matrix amounted to about 70% of the total spacers. The distance between the lines of the spacers arranged linearly was 900 μm. The number of spacers per mm² of a display surface was about 600 on average.

The conductive sections of the substrate obtained as mentioned above were cut off and the resultant substrate was assembled, as a general common electrode substrate, into a liquid crystal display by a known method. However, there were many spacers protruding from the black matrix and the display quality was not so different from that of the conventional liquid crystal display in which spacers are arranged at random.

EXAMPLE 2

The aperture section of each RGB pixel of a color filter was set to have dimensions of 83 μm×275 μm, the line width of a black matrix in the direction in which the black matrix overlies between the ITO electrodes of a common electrode was set at 30 μm, the line width of the black matrix in the direction perpendicular to the former lines was set at 17 μm and the numerical aperture was set to be almost the same as that in Example 1 and a substrate on which a common electrode in the form of 2:1 comb-shaped having conductive sections at a two-electrode side and a one-electrode side, respectively was prepared as in the case of Example 1.

As in the case of Example 1, a voltage of +700V was applied to the two-electrode-side conductive section of the 2:1 comb-shaped electrode and a voltage of +500 V was applied to the one-electrode-side 3 conductive section. While maintaining a state in which a potential difference of 200V was given, an appropriate quantity of spacers were discharged from a spacer supply tube and spread onto the substrate.

A spacer arrangement state after spreading the spacers was observed. Then it was found that most of the spacers were arranged linearly on the portions between the ITO electrodes of the two-electrode-side 2:1 comb-shaped electrode. Since the line width of the spacers arranged linearly matched with the larger width portion of the black matrix, the spacers arranged under the black matrix amounted to almost all the spacers. Also, the width between the lines of the spacers arrange linearly was about 900 μm and the number of the spacers per mm² of a display surface was about 200 on average.

The conductive sections of the substrate obtained as mentioned above were cut off and the resultant substrate was assembled, as a general common electrode substrate, into a liquid crystal display by a known method. As a result, it was possible to obtain an image of better display quality having better contrast than that of Example 1.

EXAMPLE 3

Spacers about half the quantity of those used in Example 1 were spread on the common electrode substrate of Example 1 by the same method as that in Example 1.

Further, the a segment electrode having an ITO electrode width of 80 μm and the distance between the ITO electrode of 15 μm was uses as a 2:1 comb-shaped electrode in the same manner as the common electrode of Example 1 and spacers about half the quantity of that in Example 1 were spread at the same voltage and by the same voltage applying method as in Example 1.

The spacers were arranged linearly between the ITO electrodes of the two-electrode-side 2:1 comb-shaped electrode for both of the substrates.

The conductive sections of said two substrates obtained as mentioned above were cut off and the resultant substrates were assembled, as a general common electrode substrate and a segment electrode substrate, respectively, into a liquid crystal display by a known method. As a result, the number of the spacers per mm$^2$ of a display surface was about 200 on average. Also, the lines of the-spacers arranged onto both substrates were hidden under the black matrix and about 90% of the spacers were arranged under the black matrixes. Hence, it was possible to obtain an image of high display quality having good contrast.

EXAMPLE 4

A color filter-side common electrode was made to have a 2:2 comb-shaped electrode structure such that conductive sections were formed in one of the stripe directions as in the case of Example 1. An alignment film was formed on the substrate and a rubbing treatment was conducted as in the case of Example 1. The substrate was disposed within an applicator, a voltage applying device was connected to the two conductive sections as in the case of Example 1, a DC voltage of +700V and that of +500V were applied to the conductive sections, respectively. While keeping this state, the spacers of about one-third in quantity of the spacers in Example 1 were spread.

The substrate spread with the spacers was observed with a microscope. Then, it was found that the spacers were arranged linearly between the stripe electrodes applied with a relatively +voltage (between the electrodes applied with the voltage of +700V) and between 2/2 of the strips on the substrate.

Next, the voltage values were reversed and a voltage of +500V and that of +700V were applied to the conductive sections, respectively and the spacers of one-third in quantity of that in Example 1 were applied.

The substrate spread with the spacers was observed with a microscope. Then, it was found that the spacers were arranged linearly between the strip electrodes applied with a relatively + voltage (between the electrodes applied with a voltage of +700V) different from the portions on which the spacers were arranged second time. Finally, the spacers were arranged linearly between the 1/2 stripe electrodes. The number of the spacers per mm$^2$ of a display surface was about 130 on average. The spacers hidden under the black matrix amounted to about 90% of the total spacers.

Using a color filter substrate having the spacers arranged under the black matrixes and a substrate on which TFT (thin film transistor) elements were formed, a TFT-type liquid crystal display was manufactured by a known method. At this time, the same voltage could be applied to all of the color-filter-side stripe electrodes, thereby making it possible to display images in the same manner as a conventional device using a solid electrode.

When the TFT-type liquid crystal display thus obtained was observed, excellent display quality without the influence of the spacers was confirmed.

EXAMPLE 5

An alignment film of polyimide was formed on a stripe segment electrode for an STN liquid crystal display (an ITO electrode line width of 80 μm and the distance between electrodes of 15 μm). Thereafter, the substrate which was subjected to a rubbing treatment was disposed within an applicator and a voltage applying device was connected to transparent electrodes so that positive or negative DC voltages can be arbitrarily applied to all of the transparent electrodes with a prober. (If this substrate was laminated with a color filter substrate, the directions of stripes of R: red, G: green and B: blue pixels of the color filter matched with the directions of the stripe ITO electrodes and each of the ITO electrode lines corresponds to each RGB pixel.)

The spacers of one-third in quantity of that of the spacers used in Example 1 were spread onto the substrate and a DC voltage of +500V and that of +300V were applied to ITO electrodes corresponding to RG pixels and those corresponding to B pixels, respectively during the application of the spacers. As a result, the spacers were arranged linearly between the ITO electrodes corresponding to the RG pixels.

Likewise, the spacers of one-third in quantity of that used in Example 1 were applied while a DC voltage of +500V and that of +300V were applied to the ITO electrodes corresponding to the GB pixels and to those corresponding to the R pixels, respectively. As a result, the spacers were further arranged linearly between the ITO electrodes corresponding to the GB pixels.

Next, the spacers of one-third in quantity were applied while a DC voltage of +500V and that of +300V were applied to the ITO electrodes corresponding to the BR pixels and to those corresponding to the G pixels, respectively. As a result, the spacers were arranged linearly between the ITO electrodes corresponding to the BR pixels and consequently, the spacers were arranged linearly between all the ITO electrodes.

When this substrate was assembled, as a color filter-side common electrode substrate, into a liquid crystal display by a known method, the spacers arranged under the black matrix amounted to about 95% of the total spacers. Also, the number of the spacers per mm$^2$ of a display surface was about 200 on average.

When the STN-type liquid crystal display thus obtained was observed, it was confirmed that excellent display quality was obtained without the influence of the spacers.

EXAMPLE 6

As shown in FIG. 3, ITO electrodes serving as stripe transparent electrodes (segment electrode of a line width of 80 μm and a distance of 15 μm) were formed on a glass substrate within a container main body 10 of a spacer applicator and a polyimide alignment film was formed thereon. Thereafter, a substrate for an STN-type liquid crystal display which was been subjected to a rubbing treatment was disposed and a voltage applying device 12 was connected to all of the transparent electrodes so that positive or negative DC voltage can be arbitrarily applied to the electrodes (the stripe directions of R: red, G: green and B: blue pixels of a color filter matched the directions of the stripe ITO electrodes and each ITO electrode line corresponds to each RGB pixel. Also, a black matrix was formed to have a line width of 20 μm).

An appropriate quantity of spacers (a grain size of 6 μm, MICROPEARL®, Sekisui Fine Chemical K.K.) were injected into a spacer supply tube 11 and spread onto the substrate with compressed air of 1.5 kgf/cm$^2$. At this time, the spacers had been negatively charged.

During spreading spacer, a DC voltage of +100V and that of −100V were applied to ITO electrodes corresponding to RG pixels and to those corresponding to B pixels, respectively, to provide a voltage application state for the respective ITO electrode indicated by a pattern of ++−++−++− . . . .

When the substrates spread with the spacers were observed with a microscope, it was found that the spacers were arranged between the ITO electrodes corresponding to RG pixels (applied with ++ voltages), i.e., positions corresponding to the black matrix portion.

EXAMPLE 7

Spreading spacers was carried out in the same manner as Example 6 except that a DC voltage of +500V and that of +300V were applied to ITO electrodes corresponding to the RG pixels and to those corresponding to the B pixels, respectively, so as to provide a relative voltage application state indicated by a pattern of ++−++−++− . . . .

When the substrates spread with the spacers were observed with a microscope, it was found that the spacers were arranged between the ITO electrodes corresponding to the RG pixels (applied with ++ voltages), i.e., positions corresponding to the black matrix portion.

EXAMPLE 8

Spreading the spacers was carried out in the same manner as that of Example 6 except that a DC voltage of −100V and that of −300V were applied to ITO electrodes corresponding to the RG pixels and to those corresponding to the B pixels, respectively, so as to provide a relative voltage application state indicated by a pattern of ++−++−++− . . . .

When the substrates spread with the spacers were observed with a microscope, it was found that the spacers were arranged between the ITO electrodes corresponding to the RG pixels (applied with ++ voltages), i.e., positions corresponding to the black matrix portion.

EXAMPLE 9

Spacers were spread anew onto the substrate on which the spacers were arranged between the ITO electrodes corresponding to the RG pixels by the operation of Example 6 while applying a voltage of +200V to the ITO electrodes corresponding to the GB pixels with the ITO electrodes corresponding to the R pixels at an earth potential.

As a result, the spacers were arranged between the ITO electrodes corresponding to the GB pixels anew apart from the ITO electrodes corresponding to the RG pixels between which the spacers had been already arranged.

EXAMPLE 10

Spacers were spread anew onto the substrate on which the spacers were arranged between the ITO electrodes corresponding to the RG pixels and between the ITO electrodes corresponding to GB pixels by the operation of Example 9 while applying a DC voltage of +100V to the ITO electrodes corresponding to the BR pixels and a DC voltage of −100V to the ITO electrodes corresponding to the G pixels.

As a result, the spacers were arranged between the ITO electrodes corresponding to the BR pixels anew apart from the ITO electrodes corresponding to the RG pixels and those corresponding to the GB pixels between which the spacers had been already arranged.

EXAMPLE 11

Spacers were spread on the same substrate as that in Example 6 while applying a DC voltage of +100V and that of −100V so as to provide a voltage application state indicated by a pattern of −++++−−++++− . . . for the first spreading. As a result, the spacers were arranged between the electrodes provided at the center of positions to which voltages of ++++ were spread.

Next, for the second spreading, spacers were spread on the same substrate while applying a DC voltage of +100V and that of −100V to so as to provide a voltage application state indicated by a pattern of −++−++−++ . . . . As a result, the spacers were arranged between the electrodes applied with ++ voltages which portions were different from those spread with the spacers in the first spreading.

EXAMPLE 12

Using the comb-shaped electrode substrate shown in FIG. 8(II), a DC voltage of +300V and that of +500V were applied to the conductive lines 13*a* and 13*b*, respectively and spacers were spread onto the substrate. As a result, the spacers were arranged between the two electrodes applied with relatively +, i.e., a voltage of +500V.

Thereafter, a DC voltage of +500V and that of +300V were applied to the conductive lines 13*a* and 13*b*, respectively and spacers were spread on the substrate.

As a result, the spacers were arranged between the two electrodes applied with +500V apart from the portions onto which the previous spacers had been previously arranged. Then, the conductive lines 13*a* and 13*b* were cutoff, there by manufacturing the same common electrode substrate as the conventional one.

EXAMPLE 13

Using the substrate on which the spacers in Examples 6 to 12 were arranged, an STN-type liquid crystal display was manufactured by the conventional method. When the pixel section of the completed liquid crystal display was observed with a microscope, it was found that the spacers were arranged between the electrodes, i.e., under the black matrix and, therefore, no spacers exist on the pixel section. Owing to this, it was possible to obtain an image of excellent display quality without light leakage and the like resulting from the spacers.

COMPARATIVE EXAMPLE 5

Spacers were spread while applying a DC voltage of −100V and that of +100V to the ITO electrodes corresponding to the RG pixels and those corresponding to the B pixels, respectively, in case of Example 6.

When the substrate onto which the spacers were spread was observed, it was found that the spacers were arranged in line at center positions on the ITO electrodes corresponding to the B pixels.

COMPARATIVE EXAMPLE 6

Spacers were spread while applying a DC voltage of +300V and that of +500V to the ITO electrodes corresponding to the RG pixels and those corresponding to the B pixels, respectively, in case of Example 7.

When the substrate onto which the spacers were spread was observed, it was found that the spacers were arranged in line at center positions on the ITO electrodes corresponding to the B pixels.

COMPARATIVE EXAMPLE 7

Spacers were spread while applying a DC voltage of −300V and that of −100V to the ITO electrodes corresponding to the RG pixels and those corresponding to the B pixels, respectively, in case of Example 8.

When the substrate onto which the spacers were spread was observed, it was found that the spacers were arranged in line at center positions on the ITO electrodes corresponding to the B pixels.

EXAMPLE 14

Spreading the spacers were carried out in the same manner as that in Example 6 except that a DC voltage of +150V and that of −50V were applied to ITO electrodes corresponding to the RG pixels and to those corresponding to the B pixels, respectively.

When the substrates spread with the spacers were observed with a microscope, it was found that the spacers were arranged between the ITO electrodes corresponding to the RG pixels, i.e., positions corresponding to the black matrix portion.

EXAMPLE 15

The substrate onto which the spacers were spread in Example 14 was disposed again within the container main body and spacers were spread in the same manner as that of Example 1 while applying a DC voltage of +150V and that of −50V to the ITO electrodes corresponding to the GB pixels and those corresponding to the R pixels, respectively.

When the substrate onto which the spacers were spread was observed, it was found that the spacers were arranged between the ITO electrodes corresponding to the GB pixels, i.e., portions corresponding to the black matrix portion.

EXAMPLE 16

The substrate onto which the spacers were spread in Example 15 was disposed again within the container main body and spacers were spread in the same manner as that of Example 1 while applying a DC voltage of +150V and that of −50V to the ITO electrodes corresponding to the RB pixels and those corresponding to the G pixels, respectively.

When the substrate onto which the spacers were spread was observed, it was found that the spacers were arranged between the ITO electrodes corresponding to the RB pixels, i.e., portions corresponding to the black matrix portion. Consequently, the spacers were arranged between all of the ITO electrodes.

COMPARATIVE EXAMPLE 8

Spacers were spread in the same manner as that of Example 6 except that a DC voltage of +150V and that of −50V were applied to the ITO electrodes corresponding to the R pixels and those corresponding to the GB pixels, respectively.

When the substrate onto which the spacers were spread was observed with a microscope, it was found that the spacers were arranged onto the ITO electrodes corresponding to the R pixels, i.e., onto the R pixels.

COMPARATIVE EXAMPLE 9

Spacers were spread in the same manner as that of Example 6 except that a DC voltage of +150V and that of −50V were applied to the ITO electrodes corresponding to the G pixels and those corresponding to the RB pixels, respectively.

When the substrate onto which the spacers were spread was observed with a microscope, it was found that the spacers were arranged onto the ITO electrodes corresponding to the G pixels, i.e., onto the G pixels.

COMPARATIVE EXAMPLE 10

Spacers were spread in the same manner as that of Example 6 except that a DC voltage of +150V and that of −50V were applied to the ITO electrodes corresponding to the B pixels and those corresponding to the RG pixels, respectively.

When the substrate onto which the spacers were spread was observed with a microscope, it was found that the spacers were arranged onto the ITO electrodes corresponding to the B pixels, i.e., onto the B pixels.

EXAMPLE 17

A common electrode substrate for an STN-type liquid crystal display (color filter formation substrate of an aperture of each of RGB (red, green and blue) pixels of 80×280 $\mu$m, a black matrix line width of 35 $\mu$m, an ITO electrode width of 285 $\mu$m, the distance between electrodes of 30 $\mu$m and a substrate thickness of 0.7 mm) formed to have a 2:1 comb-shaped electrode structure was prepared. A polyimide alignment film having a thickness of 0.05 $\mu$m was formed on the substrate and a rubbing treatment was conducted.

A voltage of −2000V (relatively +) and that of −2100V (relatively −) were applied to the two-electrode side of the 2:1 comb-shaped electrode and the one-electrode side thereof, respectively. While keeping this state, spacers (negatively charged) were spread onto the substrate as in the case of Example 6.

When the substrate onto which the spacers were spread was observed, it was found that the spacers were arranged in the gaps of the electrodes, where a voltage of −2000V was applied, of the two-electrode side 2:1 comb-shaped electrode. That is, the spacers were arranged onto a matrix portion.

EXAMPLE 18

An substrate of 2:2 comb-shaped electrode structure was prepared as a common electrode substrate for an STN-type liquid crystal display. The distance between of the electrodes of the 2:2 comb-shaped electrode aligned with each other and applied with the same voltage, was set at 10 $\mu$m and the distance between the electrodes applied with different voltages was set at 30 $\mu$m (color filter formation substrate of an aperture of each of RGB (red, green and blue) pixels of 76×270 $\mu$m, a black matrix line width of 40 $\mu$m and an ITO electrode width of 290 $\mu$m). A polyimide alignment film having a thickness of 0.05 $\mu$m was formed on the substrate and a rubbing treatment was conducted.

While the potential of one of the two-electrode side of the 2:2 comb-shaped electrode was set at an earth potential (relatively +), a voltage of −500V (relatively −) was applied to the other two-electrode side thereof. While keeping this state, spacers (negatively charged) were applied as in the case of Example 6.

When the substrate onto which the spacers were spread was observed, it was found that the spacers were arranged in the gaps between the two electrodes aligned with each other and given the earth potential. That is, the spacers were arranged onto a black matrix portion.

EXAMPLE 19

A common electrode substrate for an STN-type liquid crystal display (color filter and black matrix formation substrate of an ITO electrode width of 285 μm, the distance between electrodes of 15 μm and an electrode thickness of 300 μm) formed to have a 2:1 comb-shaped electrode structure was prepared. A polyimide alignment film was formed on the substrate and a rubbing treatment was conducted.

A voltage of +100V (relatively +) and that of −100V (relatively −) were applied to the two-electrode side of the 2:1 comb-shaped electrode and to the one-electrode side thereof, respectively. While keeping this state, spacers (BBS-60510-PH, Sekisui Fine Chemical K.K.) were spread onto the substrate. At this moment, the spacers had been negatively charged.

When the substrate onto which the spacers were spread was observed with a microscope, it was found that the spacers were arranged in the gaps between the electrodes at the two-electrode side of the 2:1 comb-shaped electrodes applied with a voltage of +100V.

EXAMPLE 20

A substrate of 2:2 comb-shaped electrode structure was prepared as a common electrode substrate for an STN-type liquid crystal display. The distance between the electrodes of the 2:2 comb-shaped electrode aligned with each other and applied with the same voltage was set at 15 μm and the distance between the electrodes applied with different voltages was set at 15 μm, as well (a color filter and black matrix formation substrate of an ITO electrode width of 285 μm and an electrode thickness of 300 nm). A polyimide alignment film was formed on the substrate and a rubbing treatment was conducted.

A voltage of +100V (relatively +) and that of −100V (relatively −) were applied to one of the two-electrode sides of the 2:2 comb-shaped electrode and to the other two-electrode side thereof, respectively. While keeping this state, an appropriate quantity of spacers (BBS-60510-PH, Sekisui Fine Chemical K.K.) were spread onto the substrate. At this moment, the spacers had been negatively charged.

When the substrate onto which the spacers were spread was observed with a microscope, it was found that the spacers were arranged in the gaps between the two aligned electrodes applied with a voltage of +100V.

EXAMPLE 21

Spacers were spread in the same manner as that of Example 19 except that a voltage of +500V (relatively +) and that of +300V (relatively −) were applied to the two-electrode side of the 2:1 comb-shaped electrode and to the one-electrode side thereof, respectively.

When the substrate onto which the spacers were spread was observed with a microscope, it was found that the spacers were arranged in the gaps between the two electrodes at the two-electrode side of the 2:1 comb-shaped electrode applied with a voltage of +500V.

EXAMPLE 22

Spacers were spread in the same manner as that of Example 19 except that a voltage of −300V (relatively +) and that of −500V (relatively −) were applied to the two-electrode side of the 2:1 comb-shaped electrode and to the one-electrode side thereof, respectively.

When the substrate onto which the spacers were spread was observed with a microscope, it was found that the spacers were arranged in the gaps between the two electrode at the two-electrode side of the 2:1 comb-shaped electrode applied with a voltage of −300V. Also, the spacers were arranged in a concentrated manner at the central portion of each gap between the electrodes at the two-electrode side of the 2:1 comb-shaped electrode applied with a voltage of −300V and the probability that the spacers were arranged on the edge portions was low.

EXAMPLE 23

Spacers were spread in the same manner as that of Example 19 except that a voltage of +200V (relatively +) was applied to the two-electrode side of the 2:1 comb-shaped electrode and that the potential of the one-electrode side thereof was set at an earth potential (relatively −).

When the substrate onto which the spacers were spread was observed with a microscope, it was found that the spacers were arranged in the gaps between the two electrode at the two-electrode side of the 2:1 comb-shaped electrode applied with a voltage of +200V.

EXAMPLE 24

Spacers were spread in the same manner as that of Example 19 except that a voltage of −100V (relatively −) and that of +100V (relatively +) were applied to the two-electrode side of the 2:1 comb-shaped electrode and to the one-electrode side thereof, respectively and that the spacers were positively charged.

When the substrate onto which the spacers were spread was observed with a microscope, it was found that the spacers were arranged in the gaps between the electrodes at the two-electrode side of the 2:1 comb-shaped electrode applied with a voltage of −100V.

EXAMPLE 25

Spacers were spread in the same manner as that of Example 20 except that a voltage of −100V (relatively −) and that of +100V (relatively +) were applied to the two-electrode side of the 2:2 comb-shaped electrode and to the other two-electrode side thereof, respectively and that the spacers were positively charged.

When the substrate onto which the spacers were spread was observed with a microscope, it was found that the spacers were arranged in the gaps between two electrodes aligned each other and applied with a voltage of −100V.

EXAMPLE 26

Spacers were spread in the same manner as that of Example 19 except that a voltage of +300V (relatively −) and that of +500V (relatively +) were applied to the two-electrode side of the 2:1 comb-shaped electrode and to the one-electrode side thereof, respectively and that the spacers were positively charged.

When the substrate onto which the spacers were spread was observed with a microscope, it was found that the spacers were arranged in the gaps between the electrodes at the two-electrode side of the 2:1 comb-shaped electrode applied with a voltage of +300V. Also, the spacers were arranged in a concentrated manner at the central portion of each gap between the two electrodes at the two-electrode side of the 2:1 comb-shaped electrode applied with a voltage of +300V and the probability that the spacers were arranged on the edge portions was low.

EXAMPLE 27

Spacers were spread in the same manner as that of Example 19 except that a voltage of −500V (relatively −) and that of −300V (relatively +) were applied to the two-electrode side of the 2:1 comb-shaped electrode and to the one-electrode side thereof, respectively and that the spacers were positively charged.

When the substrate onto which the spacers were spread was observed with a microscope, it was found that the spacers were arranged in the gaps between the electrodes at the two-electrode side of the 2:1 comb-shaped electrode applied with a voltage of −500V.

EXAMPLE 28

A substrate onto which spacers were arranged was manufactured in the same manner as those of Examples 19 to 27 except that the distance between the electrodes of the comb-shaped electrode aligned and applied with the same voltage was set at 10 μm and that between the electrodes of the comb-shaped electrode applied with different voltages was set at 15 μm (a black matrix line width of 30 μm).

When the substrate onto which the spacers were spread was observed with a microscope, it was found that the spacers were arranged on a black matrix portion.

EXAMPLE 29

A pair of substrates were laminated with each other using the substrates onto which the spacers of Examples 19 to 28 were arranged, heated and pressurized at 180° C. and 0.8 kg/cm² and subjected to an after-bake treatment at 150° C. Thereafter, unnecessary portions were cut off. At this moment, conductive lines were cut off. Then, an STN-type liquid crystal display having a pair of insulating substrates of soda niter having dimensions of 370×480 mm and a thickness of 0.7 mm laminated with each other was manufactured by the conventional method. The completed liquid crystal display could provide an image of excellent display quality without light leakage and the like resulting from the spacers.

INDUSTRIAL APPLICABILITY

Since the liquid crystal display according to the present invention is constituted as mentioned above, most of the spacers are arranged under the black matrix. Due to this, the device can provide excellent display quality having excellent contrast without the influence of light leakage resulting from the spacers.

In the liquid crystal display manufacturing method according to the present invention, as has been mentioned above, the spacers can be removed from onto the pixel electrode portions and arranged only onto the black matrix portion. Hence, it is possible to manufacture a liquid crystal display having extremely high contrast without light leakage resulting from the spacers.

What is claimed is:

1. A method of manufacturing a liquid crystal display wherein spacers are spread onto at least one of a first substrate on which a plurality of electrodes are aligned and a second substrate arranged on the first substrate to oppose the first substrate and a liquid crystal are injected into a gap between the both substrates, which comprises the steps of
charging and then spreading said spacers, applying voltages having two or more different voltage values to said plural electrodes, controlling an electric field generated above the electrodes, and thereby selectively arranging said spacers only between predetermined electrodes among said electrodes adjacent each other.

2. The method of manufacturing a liquid crystal display according to claim 1, wherein the spacers are spread while applying voltages having different voltage values to a plurality of electrodes formed to be aligned with one another and thereby alternately forming an area having a relatively high potential positive and an area having a relatively low potential negative; and wherein applying said voltages having different voltage values to said electrodes is based on a certain application pattern in which an electric field (electric lines of force) formed based on the voltages having different voltage values applied to said plural electrodes causes positions at which attracting forces act on said spacers most strongly and/or repulsive forces act on said spacers most weakly to be matched with positions of gaps between said plural electrodes.

3. The method of manufacturing a liquid crystal display according to claim 1, wherein the predetermined electrodes between which the spacers are selectively arranged are adjacent electrodes applied with a same potential.

4. The method of manufacturing a liquid crystal display according to claim 1, wherein the predetermined electrodes between which the spacers are selectively arranged are electrodes given a lowest potential among the voltages having two or more different voltage values applied to said plural electrodes if said spacers are positively charged or electrodes given a highest potential if said spacers are negatively charged.

5. The method of manufacturing a liquid crystal display according to claim 1, wherein a polarity of a potential with which the spacers are charged is the same as a polarity of different potentials having two or more values and applied to said plural electrodes.

6. A method of manufacturing a liquid crystal display wherein spreading spacers is repeatedly conducted a plurality of times by applying voltages to the respective linear transparent electrodes based on the certain application pattern in the method according to claim 1, said plural application of spacers are repeatedly conducted while continuously moving the certain application pattern along the linear transparent electrodes.

7. A method of manufacturing a liquid crystal display wherein spreading spacers is repeatedly conducted a plurality of times by applying voltages to the respective linear transparent electrodes based on the certain application pattern in the method according to claim 1, said plural application of spacers is repeatedly conducted while changing the certain application pattern to another pattern.

8. The method of manufacturing a liquid crystal display according to claim 1,
wherein application of voltages to the respective linear transparent electrodes is conducted by using a prober.

9. The method of manufacturing a liquid crystal display according to claim 1,
wherein application of voltages to one or more of linear transparent electrodes to be applied with two or more different potentials is carried out by a common conductive line, the common conductive line provided to make the respective linear transparent electrodes continuous to both ends or one end of the respective linear transparent electrodes.

10. The method of manufacturing a liquid crystal display according to claim 1,
wherein application of voltages to linear transparent electrodes to be applied with not less than one first voltage value not less than a certain voltage value V1 is carried out by a common conductive line, for a same voltage, the conductive line provided to make the respective linear transparent electrodes continuous to one end of the ends of the respective linear transparent electrodes, and application to voltage to linear transparent electrodes to be applied with not less than one second voltage value not more than a certain voltage value V2 is carried out by a common conductive line, the conductive line provided to make the respective transparent electrodes continuous to the other end of the ends of the respective linear transparent electrodes.

11. The method of manufacturing a liquid crystal display according to claim 1,
wherein application of voltages to linear transparent electrodes to be applied with not less than one first voltage value not more than a certain voltage value V1 is carried out by a common conductive line, for a same voltage, the conductive line provided to make the respective linear transparent electrodes continuous to one end of both ends of the respective linear transparent electrodes, and application of voltage to linear transparent electrodes to be applied with not less than one second voltage value not less than a certain voltage value V2 is carried out by a common conductive line, the conductive line provided to make the respective transparent electrodes continuous to the other end of the ends of the respective linear transparent electrodes.

12. A liquid crystal display which is manufactured by the method of manufacturing a liquid crystal display according to claim 1.

13. A method of manufacturing a liquid crystal display wherein spacers are spread onto a first substrate having a stripe linear electrode constituted by aligning a plurality of linear transparent electrodes in parallel, a second substrate is arranged above the first substrate to oppose the first substrate and a liquid crystal are injected into a gap between the substrates,
spreading said spacers is carried out by applying voltages having different voltage values to said plural linear transparent electrodes aligned in parallel and thereby alternately forming an area having a relatively high potential, positive, and an area having a relatively low potential, negative; and
wherein applying the voltages having different voltage values to the linear transparent electrodes is based on a certain application pattern in which at least one of a position at which electric lines of force formed based on the voltages having different voltage values applied to plural transparent electrodes diverge to both sides and a position at which the electric lines of force formed by said electric lines of force converge from the both sides, is matched with a position of a gap between said plurality linear transparent electrodes.

14. The method of manufacturing a liquid crystal display wherein spacers are spread onto a first substrate having a stripe transparent electrode constituted by aligning a plurality of linear transparent electrodes in parallel, a second substrate is arranged above the first substrate to oppose the first substrate and a liquid crystal are injected to a gap between the substrates,
wherein spreading said spacers is carried out by applying voltages having different voltage values to said plural linear transparent electrodes aligned in parallel and thereby alternately forming an area having a relatively high potential, positive, and an area having a relatively low potential, negative, on said stripe transparent electrode;
wherein applying the voltages having different voltage values to said linear transparent electrodes is based on a certain application pattern in which at least one of a relatively +trough and a relatively −trough in an electric field formed based on the voltages having different voltage values applied to said plural linear transparent electrodes is matched with a position of a gap between said plural linear transparent electrodes.

15. The method of manufacturing a liquid crystal display according to claim 14,
wherein applying the voltages having different voltage values to the electrodes is based on a certain application pattern in which not less than one first voltage value higher than a certain voltage value is applied to a plurality of voltages aligned in parallel and not less than one second voltage value lower than a certain voltage value is applied to not less than one electrode adjacent to said plural electrodes.

16. The method of manufacturing a liquid crystal display according to claim 14,
wherein applying the voltages having different voltage values is based on a certain application pattern in which not less than one first voltage value not less than a certain voltage value V1 is applied to a plurality of linear transparent electrodes aligned and not less than one second voltage value not more than a certain voltage value V2 is applied to not less than one linear transparent electrode adjacent to the plural linear transparent electrodes,
the number of said plural linear transparent electrodes is even,
and if a polarity of charge of the spacers is negative, said voltages V1 and V2 satisfy a relationship of V2<V1.

17. The method of manufacturing a liquid crystal display according to claim 16,
wherein applying the voltages having different voltage values is based on the certain application pattern in which not less than one first voltage value not less than the certain voltage value V1 is applied to said plural linear transparent electrodes aligned and not less than one second voltage value not more than the certain voltage value V2 is applied to not less than one linear transparent electrode adjacent to the plural linear transparent electrodes,
the number of said plural linear transparent electrodes is even,
and said voltage V1 has a reversed polarity to a polarity of charge of the spacers.

18. The method of manufacturing a liquid crystal display according to claim 16, wherein applying the voltages having different voltage values is based on the certain application pattern in which not less than one first voltage value not less than the certain voltage value V1 is applied to said plural linear transparent electrodes aligned and not less than one second voltage value not more than the certain voltage value V2 is applied to not less than one linear transparent electrode adjacent to said plural linear transparent electrodes;

said voltages V1 and V2 have the same polarity as a polarity of charge of the spacers.

19. The method of manufacturing a liquid crystal display according to claim 14, wherein applying the voltages having different voltage values is based on a certain application pattern in which not less than one first voltage value not more than a certain voltage value V1 is applied to a plurality of linear transparent electrodes aligned and not less than one second voltage value not less than a certain voltage value V2 is applied to not less than one linear transparent electrode adjacent to said plural linear transparent electrodes, the number of said plural linear transparent electrodes is even, and if a polarity of charge of the spacers is + positive, said voltages V1 and V2 satisfy the relationship V1<V2.

20. The method of manufacturing a liquid crystal display according to claim 14, wherein applying the voltages having different voltage values is based on the certain application pattern in which not less than one first voltage value not more than the certain voltage value V1 is applied to said plural linear transparent electrodes aligned and not less than one second voltage value not less than the certain voltage value V2 is applied to not less than one linear transparent electrode adjacent to said plural linear transparent electrodes, the number of said plural linear transparent electrodes is even, and said voltage V1 has a reversed polarity to a polarity of charge of the spacers.

21. The method of manufacturing a liquid crystal display according to claim 19, wherein applying the voltages having different voltage values is based on the certain application pattern in which not less than one first voltage value not more than the certain voltage value V1 is applied to said plural linear transparent electrodes aligned and not less than one second voltage value not less than the certain voltage value V2 is applied to not less than one linear transparent electrode adjacent to said plural linear transparent electrodes, the number of said plural linear transparent electrodes is even, and said voltages V1 and V2 have the same polarity as a polarity of charge of the spacers.

22. The method of manufacturing a liquid crystal display according to claim 14, wherein a gap between the linear transparent electrodes aligned with each other and applied with different voltages is set longer than a gap between the linear transparent electrodes aligned with each other and applied with a same voltage.

23. A method of manufacturing a liquid crystal display wherein spacer are spread onto a first substrate having a stripe transparent electrode constituted by aligning a plurality of linear transparent electrodes in parallel, a second substrate is arranged above the first substrate to oppose the first substrate and a liquid crystal are injected into a gap between the substrates, spreading said spacers is carried out by applying a voltage of a opposite polarity to a polarity of charge of said spacers and applying a voltage of the same polarity as the polarity of charge of said spacers to said plural linear transparent electrodes aligned in parallel, and wherein applying said voltages of opposite and same polarities comprises applying a voltage of the opposite polarity to two linear transparent electrodes, respectively, applying a voltage of the same polarity to one linear transparent electrode and applying said voltages so that the arrangement of these adjacent three linear transparent electrodes becomes a unit to be repeated, thereby spreading the spacers in the gap between the adjacent two linear transparent electrodes applied with the reversed polarity.

24. The method of manufacturing a liquid crystal display according to claim 23, wherein applying voltages of the opposite polarity and the same polarity comprises repeatedly applying a voltage of the opposite polarity, a voltage of the opposite polarity and a voltage of the same polarity in this order.

25. The method of manufacturing a liquid crystal display according to claim 23, wherein applying voltages of the opposite polarity and the same polarity comprises repeatedly applying a voltage of the opposite polarity, a voltage of the same polarity and a voltage of the opposite polarity in this order.

26. The method of manufacturing a liquid crystal display according to claim 23, wherein applying voltages of the opposite polarity and the same polarity comprises repeatedly applying a voltage of the same polarity, a voltage of the opposite polarity and a voltage of the opposite polarity in this order.

27. The method of manufacturing a liquid crystal display according to claim 23, wherein applying voltages of the opposite polarity and the same polarity is to repeatedly conduct at least two of three methods of (1) a method of repeatedly applying a voltage of the opposite polarity, a voltage of the opposite polarity and a voltage of the same polarity in this order; (2) a method of repeatedly applying a voltage of the opposite polarity, a voltage of the same polarity and a voltage of the opposite polarity in this order; and (3) a method of repeatedly applying a voltage of the same polarity, a voltage of the opposite polarity and a voltage of the opposite polarity in this order.

* * * * *